US010309217B2

(12) United States Patent
Lawson et al.

(10) Patent No.: US 10,309,217 B2
(45) Date of Patent: Jun. 4, 2019

(54) METHOD AND SYSTEM FOR RESERVOIR SURVEILLANCE UTILIZING A CLUMPED ISOTOPE AND/OR NOBLE GAS DATA

(71) Applicants: Michael Lawson, Houston, TX (US); Robert J. Pottorf, Houston, TX (US); Steven R. May, Missouri City, TX (US); Amelia C. Robinson, Houston, TX (US); Sumathy Raman, Annandale, NJ (US); Sebastien L. Dreyfus, Houston, TX (US); Cara L. Davis, Houston, TX (US)

(72) Inventors: Michael Lawson, Houston, TX (US); Robert J. Pottorf, Houston, TX (US); Steven R. May, Missouri City, TX (US); Amelia C. Robinson, Houston, TX (US); Sumathy Raman, Annandale, NJ (US); Sebastien L. Dreyfus, Houston, TX (US); Cara L. Davis, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1221 days.

(21) Appl. No.: 14/350,902

(22) PCT Filed: Nov. 9, 2012

(86) PCT No.: PCT/US2012/064552
§ 371 (c)(1),
(2) Date: Apr. 10, 2014

(87) PCT Pub. No.: WO2013/071189
PCT Pub. Date: May 16, 2013

(65) Prior Publication Data
US 2014/0250999 A1 Sep. 11, 2014

Related U.S. Application Data

(60) Provisional application No. 61/558,822, filed on Nov. 11, 2011, provisional application No. 61/616,813, filed on Mar. 28, 2012.

(51) Int. Cl.
*G01V 9/00* (2006.01)
*E21B 49/02* (2006.01)
(Continued)

(52) U.S. Cl.
CPC .......... *E21B 49/02* (2013.01); *E21B 41/0092* (2013.01); *E21B 47/1015* (2013.01);
(Continued)

(58) Field of Classification Search
CPC ....... G01V 5/06; E21B 49/088; E21B 47/065; B01D 2257/11; C01B 2210/0031; C01B 4/00; G21H 5/02
(Continued)

(56) References Cited

U.S. PATENT DOCUMENTS 3,571,591 A * 3/1971 Bradley ............... G01N 33/241
250/255
3,835,710 A 9/1974 Pogorski
(Continued)

FOREIGN PATENT DOCUMENTS

EP 2113796 11/2009
GB 2478511 9/2011
(Continued)

OTHER PUBLICATIONS

Eiler, J.M., (2007), ""Clumped-Isotope" Geochemistry—The Study of Naturally-Occurring, Multiply-Substituted Isotopologues", *ScienceDirect Earth and Planetary Science Letters*, vol. 262, pp. 309-327.
(Continued)

*Primary Examiner* — Juan C Ochoa
(74) *Attorney, Agent, or Firm* — ExxonMobil Upstream Research Company—Law Department

(57) ABSTRACT

A method is disclosed for producing hydrocarbons with the use of reservoir surveillance. The method includes interpret-
(Continued)

ing a sample to determine noble gas signatures and clumped isotope signatures for the region of interest. Then, using the region of interest fingerprint to perform reservoir surveillance on produced fluids from the subsurface regions.

20 Claims, 5 Drawing Sheets

(51) Int. Cl.
  *G01V 11/00* (2006.01)
  *E21B 41/00* (2006.01)
  *E21B 47/10* (2012.01)
  *G01V 5/00* (2006.01)

(52) U.S. Cl.
  CPC ............... *G01V 9/00* (2013.01); *G01V 5/00* (2013.01); *G01V 11/00* (2013.01)

(58) Field of Classification Search
  USPC .............. 426/648.1; 166/250.01, 250.16; 250/253; 436/29; 702/13, 6, 11; 73/152.02, 152.04; 703/10, 2
  See application file for complete search history.

(56) References Cited

U.S. PATENT DOCUMENTS

| | | | |
|---|---|---|---|
| 3,862,576 A | 1/1975 | Pogorski | |
| 3,961,187 A | 6/1976 | Barringer | |
| 4,001,764 A | 1/1977 | Holland et al. | |
| 4,022,705 A * | 5/1977 | Beckert | C01B 4/00 149/109.4 |
| 4,231,891 A * | 11/1980 | Beckert | C01B 3/08 149/19.91 |
| 4,378,055 A | 3/1983 | Bartz | |
| 4,434,364 A | 2/1984 | Correa et al. | |
| 4,560,664 A | 12/1985 | Demaison et al. | |
| 4,833,915 A * | 5/1989 | Radd | E21B 49/005 73/152.04 |
| 5,388,456 A * | 2/1995 | Kettel | G01V 9/007 166/250.16 |
| 5,439,800 A | 8/1995 | Thompson | |
| 5,798,982 A | 8/1998 | He et al. | |
| 6,246,963 B1 | 6/2001 | Cross et al. | |
| 6,509,566 B1 | 1/2003 | Wamsley et al. | |
| 6,514,915 B1 | 2/2003 | Beyer et al. | |
| 6,514,945 B1 | 2/2003 | Beyer et al. | |
| 6,578,405 B2 | 6/2003 | Kleinberg et al. | |
| 6,613,520 B2 | 9/2003 | Ashby | |
| 6,645,769 B2 | 11/2003 | Tayebi et al. | |
| 6,754,588 B2 | 6/2004 | Cross et al. | |
| 6,810,332 B2 | 10/2004 | Harrison | |
| 6,826,483 B1 | 11/2004 | Anderson et al. | |
| 6,873,570 B2 | 3/2005 | Zhu et al. | |
| 6,888,127 B2 | 5/2005 | Jones et al. | |
| 6,985,841 B2 | 1/2006 | Barroux | |
| 7,011,154 B2 | 3/2006 | Maher et al. | |
| 7,124,030 B2 | 10/2006 | Ellis | |
| 7,174,254 B2 * | 2/2007 | Ellis | G01N 33/241 702/13 |
| 7,210,342 B1 | 5/2007 | Sterner et al. | |
| 7,249,009 B2 | 7/2007 | Ferworn et al. | |
| 7,297,661 B2 | 11/2007 | Beyer et al. | |
| 7,328,107 B2 | 2/2008 | Strack et al. | |
| 7,337,660 B2 * | 3/2008 | Ibrahim | E21B 49/005 73/152.55 |
| 7,387,021 B2 | 6/2008 | DiFoggio | |
| 7,395,691 B2 | 7/2008 | Sterner et al. | |
| 7,403,858 B2 * | 7/2008 | Larin | G01V 9/007 324/350 |
| 7,520,158 B2 | 4/2009 | DiFoggio | |
| 7,526,418 B2 | 4/2009 | Pita et al. | |
| 7,529,626 B1 | 5/2009 | Ellis | |
| 7,571,644 B2 * | 8/2009 | Ibrahim | E21B 49/005 166/257 |
| 7,588,943 B2 * | 9/2009 | Prinzhofer | E21B 41/0064 436/161 |
| 7,596,480 B2 | 9/2009 | Fung et al. | |
| 7,617,082 B2 | 11/2009 | Childs et al. | |
| 7,687,769 B2 | 3/2010 | Indo et al. | |
| 7,692,429 B2 | 4/2010 | MacGregor et al. | |
| 7,704,746 B1 | 4/2010 | White et al. | |
| 7,728,291 B2 | 6/2010 | Bello | |
| 7,762,131 B2 * | 7/2010 | Ibrahim | G01N 33/2823 73/152.55 |
| 7,809,538 B2 | 10/2010 | Thomas | |
| 7,969,152 B2 | 6/2011 | Velikhov et al. | |
| 8,033,756 B2 | 10/2011 | Adamson | |
| 8,061,444 B2 * | 11/2011 | Mullins | E21B 47/022 175/45 |
| 8,071,295 B2 | 12/2011 | Ashby | |
| 8,120,362 B2 | 2/2012 | Combee | |
| 8,299,424 B2 | 10/2012 | Camilli | |
| 8,316,934 B2 | 11/2012 | Pietrobon | |
| 8,502,974 B2 | 8/2013 | Johnsen | |
| 8,505,375 B2 * | 8/2013 | Smalley | E21B 43/00 73/152.08 |
| 8,577,613 B2 | 11/2013 | Bryant et al. | |
| 8,695,703 B2 | 4/2014 | Dinariev et al. | |
| 8,714,246 B2 | 5/2014 | Pop et al. | |
| 8,805,614 B2 * | 8/2014 | Andrews | E21B 49/082 175/50 |
| 8,912,000 B2 * | 12/2014 | Daniel | H01J 49/145 166/264 |
| 8,950,251 B2 * | 2/2015 | Valentine | G01N 33/225 73/152.02 |
| 9,322,268 B2 * | 4/2016 | Zuo | E21B 49/10 |
| 2002/0120429 A1 | 8/2002 | Ortoleva | |
| 2003/0160164 A1 * | 8/2003 | Jones | G01N 21/31 250/269.1 |
| 2006/0154306 A1 * | 7/2006 | Kotlar | C12Q 1/6893 435/7.2 |
| 2007/0213937 A1 * | 9/2007 | Larin | G01V 3/082 702/14 |
| 2008/0040086 A1 | 2/2008 | Betancourt et al. | |
| 2008/0059140 A1 | 3/2008 | Salmon et al. | |
| 2008/0097735 A1 | 4/2008 | Ibrahim et al. | |
| 2008/0099241 A1 | 5/2008 | Ibrahim et al. | |
| 2008/0147326 A1 | 6/2008 | Ellis | |
| 2009/0071239 A1 | 3/2009 | Rojas et al. | |
| 2009/0150124 A1 | 6/2009 | Wilt et al. | |
| 2009/0288881 A1 * | 11/2009 | Mullins | E21B 7/04 175/50 |
| 2010/0015612 A1 | 1/2010 | Pelham et al. | |
| 2010/0086180 A1 | 4/2010 | Wallace | |
| 2010/0153050 A1 | 6/2010 | Zumberge et al. | |
| 2010/0155078 A1 | 6/2010 | Walters et al. | |
| 2010/0257004 A1 | 10/2010 | Perlmutter et al. | |
| 2010/0279209 A1 | 11/2010 | Sleat et al. | |
| 2011/0004367 A1 | 1/2011 | Saunders et al. | |
| 2011/0030465 A1 * | 2/2011 | Smalley | E21B 43/00 73/152.07 |
| 2011/0250582 A1 * | 10/2011 | Gates | C09K 8/582 435/3 |
| 2011/0264430 A1 | 10/2011 | Tapscott et al. | |
| 2011/0308790 A1 | 12/2011 | Strapoc et al. | |
| 2012/0052564 A1 | 3/2012 | Shigeura et al. | |
| 2012/0134749 A1 | 5/2012 | Darrah | |
| 2014/0200810 A1 * | 7/2014 | Zuo | E21B 49/10 702/13 |

FOREIGN PATENT DOCUMENTS

| | | |
|---|---|---|
| WO | 2003/012390 | 2/2003 |
| WO | 2004/025261 | 3/2004 |
| WO | 2007/008932 | 1/2007 |
| WO | 2008/100614 | 8/2008 |
| WO | 2010/151842 | 12/2010 |

(56) References Cited

FOREIGN PATENT DOCUMENTS

| WO | 2011/136858 | 11/2011 |
|---|---|---|
| WO | 2011/159924 | 12/2011 |
| WO | 2012/052564 | 4/2012 |

OTHER PUBLICATIONS

Hohl, D., et al. (2010), "Energy, Environment and Climate Directorate White Paper", *DCO Energy, Environment and Climate Workshop*, pp. 1-38.
Jeandel, E., et al., (2010), "Lessons Learned From Natural and Industrial Analogues for Storage of Carbon Dioxide", *International Journal of Greenhouse Gas Control*, vol. 4, pp. 890-909.
Aeschbach-Hertig, W., et al., (2000), "Palaeotemperature reconstruction from noble gases in ground water taking into account equilibrium with entrapped air", *Nature*, 405, pp. 1040-1044.
Ballentine, C. J., et al., (2002), "Production, release and transport of noble gases in the continental crust", *Reviews in Mineralogy and Geochemistry*, 47, pp. 481-538.
Ballentine, C.J., et al., (2002), "Tracing Fluid Origin, Transport and Interaction in the Crust", *Reviews in Mineralogy and Geochemistry*, 47, pp. 539-614.
Ballentine, C.J., et al., (1996), "A Magnus Opus: Helium, neon, and argon isotopes in a North Sea oilfield", *Geochemica et Cosmochimica Acta*, 60(5), 831-849.
Ballentine, C.J., et al., (1991), "Rare Gas Constraints on Hydrocarbon Accumulation, Crustal Degassing and Groundwater Flow in the Pannonian Basin", *Earth and Planetary Science Letters*, 105, pp. 229-246.
Battani, A., et al., (2010), "Trinidad Mud Volcanoes: The origin of the gas", *Shale Tectonics: AAPG Bulletin Memoir*, 93, pp. 225-238.
Bell, R. J., et al., (2007), "Calibration of an in situ membrane inlet mass spectrometer for measurements of dissolved gases and volatile organics in seawater", *Environ. Sci. Technol.* 41, pp. 8123-8128.
Bosch, A., et al., (1988), "Natural Gas Association with water and oil as depicted by atmospheric noble gases: case studies from the southeastern Mediterranean Coastal Plain", *Earth and Planetary Science Letters*, 87, 338-346.
Camilli, R., et al., (2010), "Tracking Hydrocarbon Plume Transport and Biodegradation at Deepwater Horizon", *Science* 330, pp. 201-204.
Camilli. R.C., et al., (2009), "Characterizing Spatial and Temporal Variability of Dissolved Gases in Aquatic Environments with in situ Mass Spectrometry", *Environmental Science and Technology* 43(13), pp. 5014-5021.
Camilli, R., et al. (2007), "Characterizing Marine Hydrocarbons With In-Situ Mass Spectrometry", IEEE/MTS Oceans (IEEE/MTS, Vancouver, Canada, 2007), pp. 1-7.
Chung, H.M., et al., (1988), "Origin of gaseous hydrocarbons in subsurface environments: theoretical considerations of carbon isotope distribution in M. Schoell (Ed.)", *Origins of Methane in the Earth. Chem. Geol.*, 71, pp. 97-103.
Crovetto, R., et al., (1982), "Solubilities of inert gases and methane in $H_2O$ and $D_2O$ in the temperature range of 300 to 600K", *Journal of Chemical Physics* 76(2), pp. 1077-1086.
Dunn-Norman, S., et al, (2004), "Reliability of Pressure Signals in Offshore Pipeline Leak Detection", *Final Report to Dept. of the Interior*, MMS TA&R Program SOL 1435-01-00-RP-31077.
Heaton, T.H.E., et al., (1981), "'Excess air' in groundwater", *Journal of Hydrology*, 50, pp. 201-216.
Holbrook,W.S., et al., (2003), "Thermohaline fine structure in an oceanographic front from seismic reflection profiling", *Science*, v. 301, pp. 821-824.

Huc, A., (2003), "Petroleum Geochemistry at the Dawn of the $21^{st}$ Century", *Oil & Gas Science and Technology—Rev. Ifp*, vol. 58, No. 2, pp. 233-241.
Kharaka, Y.K., et al., (1988), "The solubility of noble gases in crude oil at 25-100° C.", *Applied Geochemistry*, 3, pp. 137-144.
Kinsey, J.C., et al., (2011), "Assessing the deepwater horizon oil spill with the sentry autonomous underwater vehicle", *IROS'11-2011 IEEE/RSJ International Conference on Intelligent Robots and Systems: Celebrating 50 Years of Robotics*. IEEE International Conference on Intelligent Robots and Systems, pp. 261-267.
Jakuba, M.V., et al., (2011), "Toward automatic classification of chemical sensor data from autonomous underwater vehicles", *AIROS'11-2011 IEEE/RSJ International Conference on Intelligent Robots and Systems: Celebrating 50 Years of Robotics*. IEEE International Conference on Intelligent Robots and Systems, pp. 4722-4727.
Lamontagne, R.A., et al., (2001), "Response of METS Sensor to Methane Concentrations Found on the Texas-Louisiana Shelf in the Gulf of Mexico", *Naval Research Laboratory report NRL/MR/6110*—01-8584, pp. 1-13.
Larter, S.R., et al., (1995), "Reservoir geochemistry: methods, applications and opportunities", *Geological Society of London Special Publication*, 86, pp. 5-32.
Liu, W., et al. (2007), "Ternary Geochemical-Tracing System in Natural Gas Accumulation", *Science in China Series D—Earth Sciences*, vol. 50, No. 10, pp. 1494-1503.
Makris NC, et al. (2006), "Fish Population and Behavior Revealed by Instantaneous Continental Shelf-Scale Imaging", *Science*, 311, pp. 660-663.
Mangelsdorf, K., et al., (2011), "Microbial Lipid Markers Within and Adjacent to Challenger Mound in The Belgica Carbonate Mound Province, Porcupine Basin, Offshore Ireland (IODP Expedition 307)", *Marine Geology* 282, pp. 91-101.
Narr, W.M., et al., (1984), "Origin of reservoir fractures in Little Knife Field, North Dakota", *American Association of Petroleum Geologists Bulletin*, 68, pp. 1087-1100.
Ozgul, E., (2002), "Geochemical Assessment of Gaseous Hydrocarbons: Mixing of Bacterial and Thermogenic Methane in the Deep Subsurface Petroleum System, Gulf of Mexico Continental Slope", *Thesis, Texas A&M University*, pp. 1-167.
Pinti, D.L., et al., (1995), "Noble gases in crude oils from the Paris Basin: Implications for the origin of fluids and constraints on oil-was-gas-interactions", *Geochemica et Cosmochimica Acta*, 59(16), pp. 3389-3404.
Prinzhofer, A., et al. (2003), "Gas Isotopes Tracing: An Important Tool for Hydrocarbons Exploration", *Oil & Gas Science and Technology—Rev. Ifp*, vol. 58, No. 2, pp. 299-311.
Sackett, WM, (1977), "Use of Hydrocarbon Sniffing in Offshore Exploration", *Journal of Geochemical Exploration* 7, pp. 243-254.
Smith, S.P., (1985), "Noble gas solubility in water at high temperature", *EOS Transactions of the American Geophysical Union*, 66, pp. 397.
Valentine, D.L, et al., (2010), "Asphalt Volcanoes as a Potential Source of Methane to Late Pleistocene Coastal Waters", *Nature Geoscience Letters*, DOI: 10.1038/NGE0848, pp. 345-348.
Zaikowski, A., et al., (1990), "Noble gas and methane partitioning from ground water: An aid to natural gas exploration and reservoir evaluation", *Geology*, 18, pp. 72-74.
Zartman, R.E., et al., (1961), "Helium, argon, and carbon in some natural gases", *Journal of geophysical research*, 66(1), pp. 227-306.
Zhang, Y., et al., (2011), "A peak-capture algorithm used on an autonomous underwater vehicle in the 2010 Gulf of Mexico oil spill response scientific survey", *Journal of Field Robotics*, vol. 28, No. 4, pp. 484-496.

\* cited by examiner

METHOD AND SYSTEM FOR RESERVOIR SURVEILLANCE UTILIZING A CLUMPED ISOTOPE AND/OR NOBLE GAS DATA

CROSS-REFERENCE TO RELATED APPLICATION

This application is the National Stage of International Application No. PCT/US2012/064552, that published as WO 2013/07119, filed 9 Nov. 2012, which claims the priority benefit of International Application No. PCT/US2012/52542, filed 27 Aug. 2012, which claims the benefit of U.S. Provisional Patent Application 61/558,822 filed 11 Nov. 2011 entitled METHOD FOR DETERMINING THE PRESENCE AND LOCATION OF A SUBSURFACE HYDROCARBON ACCUMULATION AND THE ORIGIN OF THE ASSOCIATED HYDROCARBONS, each of which is incorporated herein by reference, in its entirety, for all purposes. This application also claims the benefit of U.S. Provisional Patent Application 61/616,813 FILED 28 Mar. 2012, entitled METHOD FOR DETERMINING THE PRESENCE AND VOLUME OF A SUBSURFACE HYDROCARBON ACCUMULATION, the entirety of which is incorporated by reference herein.

FIELD OF THE DISCLOSURE

Embodiments of the present disclosure relate generally to the field of geochemistry. More particularly, the present disclosure relates to systems and methods for managing hydrocarbon production by performing reservoir surveillance through the use of clumped isotope data, noble gas data, or the combination of clumped isotope and noble gas data. This noble gas and/or clumped isotope data is combined with geochemical and physical data to develop comprehensive geochemical fingerprints required for performing reservoir surveillance for one or more areas of interest.

BACKGROUND

This section is intended to introduce various aspects of the art, which may be associated with exemplary embodiments of the present disclosure. This discussion is believed to assist in providing a framework to facilitate a better understanding of particular aspects of the disclosed methodologies and techniques. Accordingly, it should be understood that this section should be read in this light, and not necessarily as admissions of prior art.

To produce hydrocarbons from subsurface accumulations or formations, a development plan is typically utilized. The development plan may include a reservoir depletion scheme and a reservoir surveillance strategy. Such reservoir surveillance strategy may include monitoring the production fluids for detection and prediction of static reservoir compartmentalization and to determine the mixing proportions of different reservoir intervals in a co-mingled hydrocarbon phase for the long term delivery of hydrocarbons (e.g., production allocation). An additional consideration in reservoir development is predicting how reservoir performance may change over production timescales of up to 10 s of years. The prediction of dynamic changes in hydrocarbon producibility from individual compartments, intervals and individual reservoirs typically relies on measurements of in-situ fluid properties, such as from P-V-T studies, and may be influenced by chemical or physical processes, such as liquid drop out, for example.

An effective technique to mitigate the effects of chemical or physical processes that may negatively impact reservoir performance is through the monitoring of geochemical and physical parameters (such as pressure). That is, a change in conditions may be identified and then adjustments to the production of hydrocarbons are performed. Indeed, petroleum geochemistry has been applied to several aspects of reservoir surveillance based on the variability of fluid compositions within the same compartments, intervals or reservoirs. See e.g., Larter and Aplin, (1995). See, e.g., Larter, S. R., and Aplin, A. C. Reservoir geochemistry: methods, applications and opportunities. *Geological Society of London Special Publication*, 86, 5-32, 1995. For example, isotopic and molecular compositional analyses of hydrocarbons and/or water provide different signatures of reservoir hydrocarbon products and waters when differences in signatures exist between intervals or compartments. However, these isotopic and compositional signatures have limited application in static reservoir surveillance applications when the geochemical signatures of hydrocarbons derived from different reservoirs or compartments in the area of interest are indistinguishable. Additionally, in dynamic reservoir surveillance applications, traditional techniques are reactive to the onset of such processes and do not provide advance indications of impending changes in reservoir fluid properties. This is exacerbated by the fact that there is a paucity of tracers available to conduct reservoir surveillance in predominantly natural gas reservoir systems. Indeed, at present typically only bulk organic and inorganic geochemistry and/or stable isotope systematics of carbon and hydrogen are utilized in such investigations or monitoring practices. Furthermore, bulk composition and stable isotopes can provide information on source, maturation and the extent of alteration processes such as biodegradation. These techniques do not provide insights into physical processes, such as phase transformations, liquid drop-out or degassing of formation water, nor do they allow for estimates of HC volume changes that occur during production from a compartment, interval or reservoir (region of interest).

As a result, enhancements to geochemical tracers are needed for reservoir surveillance. These indictors may provide a greater variability than current tracers and display sensitivity to chemical and/or physical processes to provide a more effective static and dynamic reservoir surveillance monitoring techniques. In this manner, the depletion strategies may be adjusted to improve hydrocarbon production and advance our understanding of long-term assessment and management practices.

SUMMARY

In one embodiment, a method of producing hydrocarbons is described. The method may include: obtaining a sample from one of the one or more subsurface regions; interpreting the sample to determine of one or more of a noble gas signatures and a clumped isotope signatures for the obtained samples; generating a region of interest fingerprint having one or more of a noble gas signature and a clumped isotope signature for the obtained samples; producing fluids from the one of the one or more subsurface regions, wherein the produced fluids comprise hydrocarbons; and performing reservoir surveillance on the produced fluids from the one of the one or more subsurface regions.

In one or more embodiments, the method may include certain features. For example, the performing reservoir surveillance on the produced fluids further comprises: obtaining a first sample from the produced fluids; determining a first sample fingerprint for the obtained first sample, wherein the first sample fingerprint comprises one or more of a noble gas signature and a clumped isotope signature; comparing the first sample fingerprint to the region of interest fingerprint; and determining whether the first sample fingerprint has changed based on the comparison of the region of first sample fingerprint with the region of interest fingerprint. In another example, performing reservoir surveillance on the produced fluids further comprising: obtaining a second sample from the produced fluids, wherein the second sample is obtained a period of time after the obtaining of the first sample; determining a second sample fingerprint for the obtained second sample, wherein the second sample fingerprint comprises one or more of a noble gas signature and a clumped isotope signature; comparing the second sample fingerprint to the region of interest fingerprint; and determining whether the second sample fingerprint has changed based on the comparison of the second sample fingerprint with the region of interest fingerprint. Further, the comparison is between the first sample fingerprint and a static fingerprint for the regions of interest to determine inter-regional changes and/or the comparison is between the first sample fingerprint and a dynamic fingerprint for the regions of interest to determine intra-regional changes. The method may also include developing a depletion strategy based on the region of interest fingerprint to produce hydrocarbons of a specific quality and composition.

These and other features and advantages of the present disclosure will be readily apparent upon consideration of the following description in conjunction with the accompanying drawings.

BRIEF DESCRIPTION OF THE DRAWINGS

Advantages of the present techniques may become apparent upon reviewing the following detailed description and the accompanying drawings.

DETAILED DESCRIPTION

Figure 1:
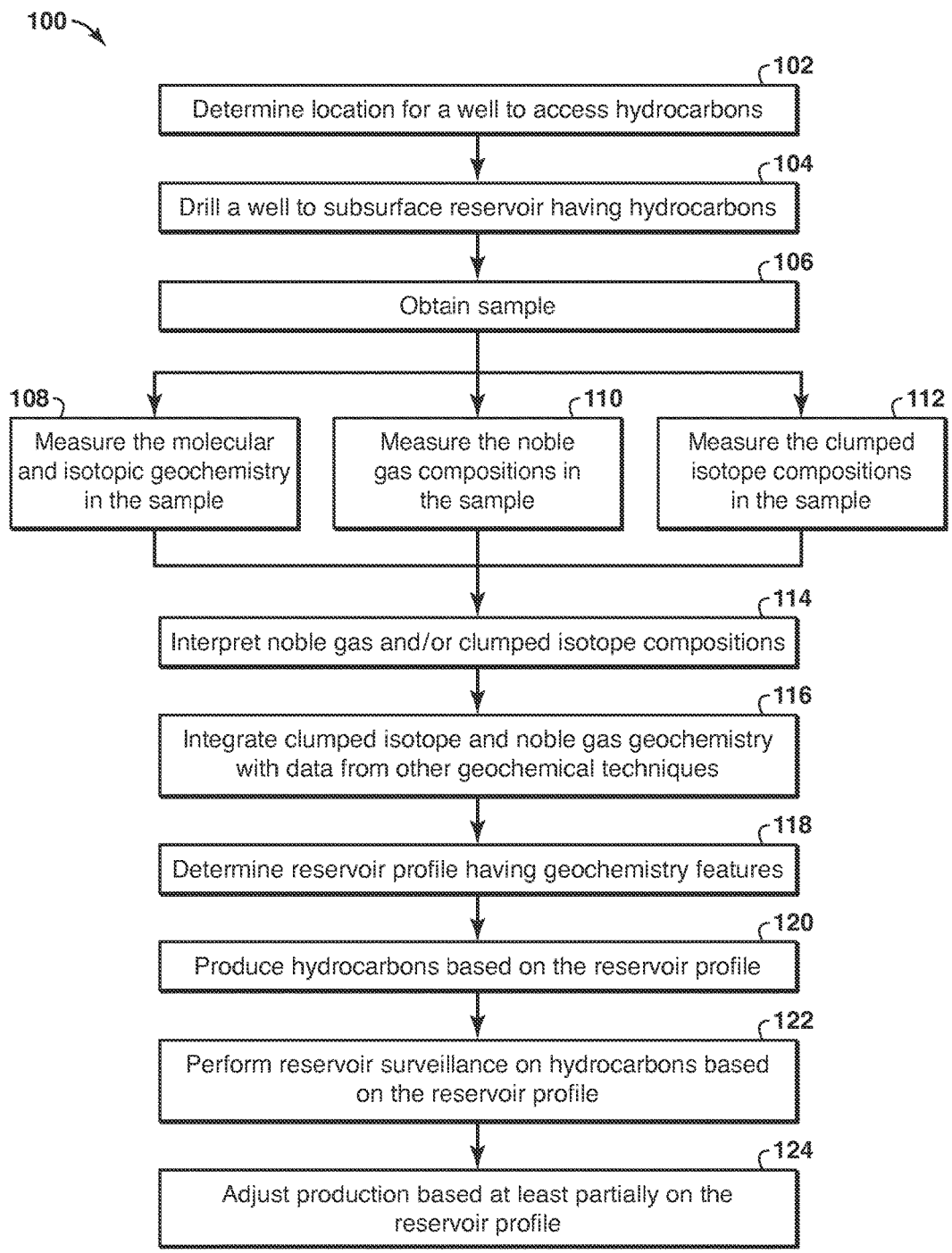
FIG. 1 is a flow diagram for producing hydrocarbons in accordance with an exemplary embodiment of the present techniques.

Various terms as used herein are defined below. To the extent a term used in a claim is not defined below, it should be given the definition persons in the pertinent art have given that term in the context in which it is used.

As used herein, "a" or "an" entity refers to one or more of that entity. As such, the terms "a" (or "an"), "one or more", and "at least one" can be used interchangeably herein unless a limit is specifically stated.

As used herein, the terms "comprising," "comprises," "comprise," "comprised," "containing," "contains," "contain," "having," "has," "have," "including," "includes," and "include" are open-ended transition terms used to transition from a subject recited before the term to one or more elements recited after the term, where the element or elements listed after the transition term are not necessarily the only elements that make up the subject.

As used herein, "exemplary" means exclusively "serving as an example, instance, or illustration." Any embodiment described herein as exemplary is not to be construed as preferred or advantageous over other embodiments.

As used herein "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, and sulfur. Nonhydrocarbon gases, such as hydrogen sulfide ($H_2S$), nitrogen gas ($N_2$) and carbon dioxide ($CO_2$), may be produced with or in addition to hydrocarbons. Hydrocarbons and nonhydrocarbon gases may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons and nonhydrocarbon gases may be located within or adjacent to mineral matrices within the earth, termed reservoirs. Matrices may include, but are not limited to, sedimentary rock, sands, silicates, carbonates, diatomites, and other porous media.

As used herein, "hydrocarbon production" or "producing hydrocarbons" refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example chemicals or hydraulic fracturing the wellbore to promote increased flow, well servicing, well logging, and other well and wellbore treatments.

As used herein the term "noble gases" refers to a series of chemically inert elements that exhibit similar properties. The six noble gases that occur naturally are helium (He), neon (Ne), argon (Ar), krypton (Kr), xenon (Xe) and radon (Rn). The noble gases considered in this disclosure are He, Ne, Ar, Kr and Xe.

As used herein the term "isotope" refers to one of two or more atoms with the same atomic number but with different numbers of neutrons. For example, helium can be present as one of two stable isotopes: $^3He$, which has 2 protons and 1 neutron (shown herein as $^3He$); and, $^4He$, which has 2 protons and 2 neutrons.

As used herein the term "signatures" refers to the relative abundances, concentrations and/or ratios of various elements and isotopes of a given species.

As used herein the term "formation water" refers to any water that resides within the subsurface that may be present in a reservoir rock, however water in the subsurface may also occur in aquifers, sediments, or not associated with a hydrocarbon occurrence. For the purposes indicated here, the primary focus is on water occurring in the porous media within the accumulation or immediately below but in contact with the hydrocarbon accumulation (i.e. the water leg). This may derive from a) meteoric origin, b) recharge of surface waters such as rain water or seawater that then migrates through permeable rock within the subsurface, and/or c) water trapped in the sediment during burial and remaining in place.

As used herein the term "residence time" refers to the time period that formation water has been present within the subsurface, and can be considered the age of the formation water.

As used herein the term "radiogenic" refers to generation or creation of a substance through radioactive decay of another substance. Radiogenic noble gases include $^{4}$He, $^{21}$Ne, $^{40}$Ar, $^{82}$Kr, $^{86}$Kr, $^{129}$Xe, $^{130}$Xe and $^{136}$Xe.

As used herein the term "region of interest" refers to an interval, compartment, or reservoir where hydrocarbons, non-hydrocarbon gases and/or water may reside. "Regions of interest" refer to multiple intervals, compartments, or reservoirs where hydrocarbons, non-hydrocarbon gases and/or water may reside.

As used herein the term "inter-regional" or "inter-compartment" refers to comparisons of multiple geochemical fingerprints derived from multiple regions of interest including but not limited to compartments, intervals or reservoirs. Deviations in "inter-regional" fingerprints may be derived from different proportions of individual regions of interest contributing to a combined flow stream during production, multiple compartments that are connected in the subsurface that produce a fingerprint consistent with multiple inputs, and the like. "intra-regional" or "intra-compartment" refers to comparisons of multiple geochemical fingerprints derived from one region of interest including but not limited to compartments, intervals or reservoirs. Deviations in "intra-regional" fingerprints are derived from changes in the properties of one region of interest such that the fluids produced or processes occurring within one region of interest.

As used herein the term "fingerprint" or "geochemical fingerprint" refers to a collection of geochemical signatures that are associated with a particular region of interest.

As used herein the term "signatures" refers to chemical or geochemical compositions, components, concentrations or ratios of one or more elements, isotopes, compounds, or the like. These signatures may be derived from one or more of the following, hydrocarbons, non-hydrocarbon gases, water, noble gases, and clumped isotopes As used herein the term "thermogenic" refers to hydrocarbons generated from kerogen that is currently/has in the past been subjected to high temperature and pressure.

As used herein the term "de-risk" refers to an assessment of the possibility that undesirable species such as $H_2S$, $CO_2$ are present at concentrations that make production or refining of hydrocarbons more difficult or reduce the value of produced hydrocarbons.

As used herein, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and/or a computer. One or more computer components can reside within a process and/or thread of execution and a computer component can be localized on one computer and/or distributed between two or more computers.

As used herein, the terms "computer-readable medium" or "tangible machine-readable medium" refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "modeling", "modifying", "measuring", "comparing", "determining", "analyzing", "outputting", "displaying", "estimating", "integrating", or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

In the following section, specific embodiments of the disclosed methodologies and techniques are described in connection with disclosed aspects and techniques. However, to the extent that the following description is specific to a particular aspect, technique, or a particular use, this is intended to be for exemplary purposes only and is not limited to the disclosed aspects and techniques described below, but rather include all alternatives, modifications, and equivalents falling within the scope of the appended claims.

This present disclosure involves a system and method for more effectively producing hydrocarbons through the use of reservoir surveillance. In particular, the present techniques provide a new suite of conservative geochemical tracers that have a greater variability than current techniques and that display sensitivity to chemical and/or physical processes to provide a more effective static and dynamic reservoir surveillance monitoring technology. In particular, some applications of the method provide a means for prediction and/or identification of the early onset of physical processes that occur within reservoirs in advance of the impact being observed at the producing well. This prediction may be utilized to improve depletion strategies by responding to production changes before the changes become a significant concern. That is, the depletion strategy may be adjusted to reduce periods of well closure and ultimately enhance hydrocarbon production. Accordingly, the integration of geochemical tracers and physical properties provides a valuable inexpensive, predictive method that provides a more comprehensive suite of technologies for reservoir surveillance.

In one or more embodiments, the present techniques may include combining clumped isotopic signatures of hydrocarbon and non-hydrocarbon gases (e.g., $CO_2$, $H_2S$, $N_2$, $H_2$) gases with noble gas elemental and isotopic signatures obtained from gas, oil, water and fluid inclusion samples. The use of these two geochemical technologies, which are clumped isotope geochemistry and noble gas geochemistry, may enhance the reservoir surveillance process. When combined and integrated with traditional geochemical techniques, such as molecular (e.g., methane, ethane, carbon dioxide, nitrogen), bulk (e.g., mixtures of gases) or stable isotope geochemistry (e.g., carbon, hydrogen, nitrogen, sulfur) of hydrocarbon and non-hydrocarbon gases and physical measurements (e.g., pressure, volume and temperature (PVT), these techniques provide enhancements to reservoir surveillance from sampling to identify individual regions of interest (e.g., reservoirs, intervals or compartments) and the subsequent monitoring of produced hydrocarbons. That is, new geochemical tracers may be utilized to perform reservoir surveillance techniques, such as production allocation when traditional techniques do not have the necessary sensitivity to distinguish between flows from different regions of interest. It also for the first time provides a tool that can predict or identify the early onset of chemical and/or physical processes such as liquid drop out that may have detrimental effects on reservoir performance. This technology provides a mechanism to alter production strategies to prevent or mitigate the impact of such processes on the production of hydrocarbons.

The noble gases (He, Ne, Ar, Kr, and Xe) are a group of chemically inert, or conservative, gases which have a low natural abundance in crustal systems. Various physical processes have resulted in different pools of noble gases (the mantle, atmospheric and crustal pools) becoming distinct in their isotopic composition and relative elemental abundances. The low abundance and the distinct isotopic character of noble gases within the different pools means that contributions from these different sources to an accumulated crustal fluid, such as a hydrocarbon accumulation, can often be resolved and quantified (Ballentine and Burnard, 2002). See, e.g., Ballentine, C. J., and Burnard, P. G. Production, release and transport of noble gases in the continental crust. *Reviews in Mineralogy and Geochemistry*, 47, 481-538, 2002. The reservoir composition of noble gases is controlled by the amount of atmospheric noble gases (e.g. $^{20}Ne$, $^{36}Ar$) introduced from formation water and the ingrowth of radiogenic noble gases (e.g. $^{4}He$, $^{40}Ar$) produced by the radioactive decay of uranium, thorium or potassium bearing minerals within the reservoir. This latter component is ultimately controlled by the concentration of these minerals and the timescales over which ingrowth has occurred. The conservative nature of noble gases means that are not involved in chemical or biological processes that may impact other geochemical tracers. However, they are sensitive to physical processes, such as phase separation, gas stripping and degassing.

The concentrations of noble gases in oil, gas, and water are based on the combined influence of their solubilities, which are a function of pressure, temperature, and fluid composition (P-T-X) that prevailed during dissolution or exsolution, interaction and mixing with other fluids, and the ingrowth of noble gases from the radioactive decay of crustal minerals. If the water PTX conditions in contact with a subsurface HC accumulation can be estimated or measured, the hydrocarbon accumulation size can be estimated or calculated based on the solubility partitioning of noble gases between water and hydrocarbons.

As an example, one embodiment may include a method for determining the volume and gas/oil, condensate/gas or gas/water or oil/water ratio of a subsurface hydrocarbon accumulation from a sample related thereto. An initial concentration of atmospheric noble gases present in formation water in contact with the subsurface hydrocarbon accumulation is measured or modeled. The modeled initial concentration is modified by accounting for ingrowth of radiogenic noble gases over time into the formation water. A sample related to the subsurface hydrocarbon accumulation is obtained. Concentrations and isotopic ratios of noble gases present in the sample are measured. The measured concentrations and isotopic ratios of the atmospheric noble gases and the radiogenic noble gases present in the sample are compared to the measured/modified modeled concentrations of the formation water for a plurality of exchange processes. A source of hydrocarbons present in the sample is determined. An atmospheric noble gas signature measured in the hydrocarbon phase is compared with the measured/modified modeled concentration of the atmospheric noble gases in the formation water for the plurality of exchange processes. A type and hydrocarbon/water volume ratio in the subsurface accumulation, and/or gas/oil, condensate/gas or and a volume of the subsurface accumulation is determined.

In another aspect, a method is disclosed for determining a type and volume of a subsurface hydrocarbon accumulation based on analysis of a sample related thereto. The sample is analyzed to determine a geochemical signature of the sample. An initial concentration of atmospheric noble gases present in formation water in contact with the subsurface hydrocarbon accumulation is determined. Ingrowth of radiogenic noble gases is modeled to modify the initial concentration for given formation water residence times. A residence time of the formation water is determined. An extent of interaction with a hydrocarbon phase is determined. The origin of the sample is determined. A hydrocarbon/water volume ratio when the origin of the sample is a hydrocarbon accumulation is determined. From the hydrocarbon/water volume ratio, the volume of the hydrocarbon accumulation is determined.

In another aspect, a method is disclosed for determining a type and volume of a subsurface hydrocarbon accumulation from a hydrocarbon sample thereof. An initial concentration of atmospheric noble gases present alongside a hydrocarbon species is determined. A range of expected concentrations of atmospheric and radiogenic noble gases present in the sample is modeled for a range of residence times and for various extents of interaction between formation water and a hydrocarbon phase. Concentrations and isotopic ratios of noble gases present in the sample are measured. The measured noble gas concentrations are compared with the modeled range of expected concentrations of atmospheric and radiogenic noble gases. Using the comparison it is determined whether the hydrocarbons present in the sample have escaped from the subsurface accumulation. From the measured noble gas concentrations and the modeled range of expected concentrations of atmospheric and radiogenic noble gases, the hydrocarbon/formation water volume ratio of the subsurface hydrocarbon accumulation is estimated. The hydrocarbon/formation water volume ratio of the subsurface accumulation are integrated with seismic reflection constraints on a volume of the hydrocarbon accumulation and a volume of water present in the hydrocarbon accumulation, thereby determining the volume of hydrocarbons present in the subsurface accumulation.

The computer system includes a processor and a tangible, machine-readable storage medium that stores machine-readable instructions for execution by the processor. The machine-readable instructions include: code for determining an expected concentration of isotopologues of a hydrocarbon species; code for modeling, using high-level ab initio calculations, an expected temperature dependence of isotopologues present in the sample; code for measuring a clumped isotopic signature of the isotopologues present in the sample; code for comparing the clumped isotopic signature with the expected concentration of isotopologues; and code for determining, using said comparison, whether hydrocarbons present in the sample originate directly from a source rock or whether the hydrocarbons present in the sample have escaped from a subsurface accumulation.

The clumped isotope geochemistry is based on the variation in the distribution of isotopes within a molecule that gives rise to molecules that are identical in their elemental composition, but that may differ in the isotopic composition of individual atoms within that molecule. These species are called isotopologues. For example, there are three isotopologues of nitrogen ($^{14}N_2$, $^{15}N^{14}N$ and $^{15}N_2$). An isotopologue in which two or more rare isotopes are present in close proximity (i.e., isotopic "clumps") is called a multiply-substituted isotopologue or clumped isotope (e.g., $^{15}N_2$). The hydrocarbon isotopologue involves hydrocarbon compounds (e.g., carbon and hydrogen atoms) that have natural isotopes of $^{12}C$, $^{13}C$, $^{1}H$, or $^{2}H$ (deuterium or D). $^{12}C$ forms 98.93% of the carbon on Earth, while 13C forms the remaining 1.07%. Similarly, the isotopic abundance of $^{1}H$ on earth is 99.985% while $^{2}H$ has an abundance of 0.015%. The clumped isotope signature of any molecule is a function of (i) temperature-independent randomly populated processes (stochastic distribution) and (ii) thermal equilibrium isotopic exchange. The latter process may be controlled or dependent on the surrounding temperature. The stochastic distribution of any isotopologue can be determined from the bulk isotope signatures of the species from which it derives. For example, determining the stochastic distribution of isotopologues for methane requires knowledge of the $^{13}C$ and D signatures of methane.

As an example, one embodiment may include a method of determining a location of a subsurface hydrocarbon accumulation or region of interest from a sample of naturally occurring substance. According to the method, an expected concentration of isotopologues of a hydrocarbon species is determined. An expected temperature dependence of isotopologues present in the sample is modeled using high-level ab initio calculations. A clumped isotopic signature of the isotopologues present in the sample is measured. The clumped isotopic signature is compared with the expected concentration of isotopologues. The current equilibrium storage temperature of the hydrocarbon species in the region of interest is determined. A location of the region of interest is determined. Various aspects of the present techniques are described further in FIGS. 1 to 5.

FIG. 1 is a flow diagram 100 for producing hydrocarbons in accordance with an embodiment of the present techniques. The flow diagram 100 includes the acquisition of fluid samples (e.g., water, gas and/or oil) and material samples (e.g., cuttings or core samples) from isolated regions of interest (e.g., compartments, intervals or reservoirs). The flow diagram 100 includes a drilling stage, which includes blocks 102 to 106, an analysis stage, which includes blocks 108 to 118, and followed by a hydrocarbon production stage, which includes blocks 120 and 124.

To begin, the method includes drilling stage, which includes blocks 102 to 106. At block 102, a location for a well to access the hydrocarbons is determined. The determination of the drilling location may be based on different data and models associated with the subsurface region. At block 104, a well is drilled to subsurface reservoir having hydrocarbons. The drilling of the well may be performed using commonly used techniques. Then, samples may be obtained, as shown in block 106. The samples, which may include fluid samples (e.g., water, gas and/or oil) and material samples (e.g., cuttings or core samples) from isolated regions of interest, may be obtained concurrent with the drilling of the well or subsequent to the drilling of the well. Fluid samples can be collected by techniques, such as drill stem tests (DTS's), separator samples, open hole modular dynamic testing (MDT) or similar, while material samples of core or cutting samples are typically collected when drilling the well. The obtaining of the sample may also depend on the type of sample and the objective to be determined (e.g., fluid inclusions vs. gas samples). For example, samples for noble gas analysis, as noted below in block 110, may be collected in sampling devices that prevents intrusion of atmospheric contamination for gases.

After the samples are obtained, an analysis stage, which includes blocks 108 to 118, is performed. With the obtained samples, one or more of blocks 108, 110 and 112 may be performed on the samples. The different analysis techniques may include measuring the molecular and isotopic geochemistry in the sample, as noted in block 108, measuring the noble gas compositions in the sample, as noted in block 110 and/or measuring the clumped isotope compositions in the sample, as noted in block 112. Measurements of the molecular, bulk and isotope geochemistry of gas, water, and oil samples are conducted to characterize the organic signature of fluids including water and hydrocarbons extracted from the sample. This may include gas chromatography-mass spectrometry (GC/MS), GC/GC/MS, liquid chromatography. Inorganic analysis of samples may also be conducted. This may include but is not restricted to inductively coupled plasma mass spectrometry (ICP-MS) and ICP-optical emission spectroscopy. Gas chemistry analysis may also be conducted and may include isotope ratio-mass spectrometry and GC. Measurement of the abundance of each noble gas isotope can be conducted following standard extraction techniques using mass spectrometry. Measurement of the abundance of each clumped isotope or isotopologue can be conducted using multiple techniques, such as mass spectrometry and/or laser-based spectroscopy.

Then, at block 114, the noble gas and/or clumped isotope compositions may be interpreted. The interpretation may include characterizing noble gas elements and isotopic signatures, and clumped isotope signatures, which may be created into a sample fingerprint. The compositions obtained by noble gas and/or clumped isotope analysis may be interpreted in context of the individual region of interest, such as a reservoir or a compartment. The noble gas signatures of different regions of interest vary because of differences in reservoir mineralogy (which control the radiogenic noble gas concentrations), fluid history (e.g., loss of noble gases due to degassing of oils, dissolution in to formation waters that subsequently migrate, etc.) and interactions between fluid phases within the reservoir. Similarly, the clumped isotope signatures may differ between reservoirs because of their sensitivity to the temperature of the reservoir and the stable isotope signatures. The stable isotopes signatures may not differ between regions of interest, such as compartments or reservoirs; however the clumped isotope signature varies between regions of interest at different temperature regimes, but may not differ between compartments of the same reservoir.

At block 116, the clumped isotope and noble gas geochemical signatures may be integrated with data from other geochemical techniques. These geochemical techniques may include traditional molecular and isotopic techniques, which include, but are not restricted to, biomarker signatures, stable isotopes of carbon and hydrogen, and non-hydrocarbon gas compositions (e.g., $H_2S$, $N_2$, $CO_2$). These interpretations may also be further refined by integration with other traditional geochemical data as listed above to identify common differences associated with additional parameters, such as source facies, thermal maturity, and thermogenic versus biogenic gas, origin of non-hydrocarbon gases, etc. Then, at block 118, a region of interest fingerprint may be determined by having multiple geochemical signatures. The region of interest fingerprint may include the combination of one or more of the analyzed data, which may be utilized as different tracers. This fingerprint is unique to individual regions of interest (e.g., compartments, intervals or reservoirs of interest). Once region of interest fingerprints are obtained they can be used in a wide range of reservoir surveillance operations and to enhance depletion strategies.

After the region of interest fingerprints determined, a hydrocarbon production stage, which includes blocks 120 and 124, is performed. At block 120, hydrocarbons may be produced based on the region of interest fingerprint. The hydrocarbons may be produced from the hydrocarbon reservoir or accumulation based on the depletion strategy. The production may include installing a production facility that is configured to monitor and produce hydrocarbons from the production intervals that provide access to the reservoir located in subsurface formation. The production facility may include one or more units to process and manage the flow of production fluids, such as hydrocarbons and/or water, from the formation. To access the production intervals, the production facility may be coupled to a tree and various control valves via a control umbilical, production tubing for passing fluids from the tree to the production facility, control tubing for hydraulic or electrical devices, and a control cable for communicating with other devices within the wellbore.

At block 122, reservoir surveillance may be performed on the hydrocarbons based on the region of interest fingerprint. That is, the produced fluids may be analyzed to determine the geochemical signatures. These geochemical signatures may be determined in a manner similar to the techniques utilized in any one of blocks 108 to 116. An example of the reservoir surveillance is further described in FIG. 2.

At block 124, the adjustments to production may be performed based at least partially on the region of interest fingerprint. These adjustments may include performing one or more operational tasks to enhance the recovery of hydrocarbons. As an example, the operational tasks may include reducing or interrupting flow from one or more of the reservoirs.

Beneficially, the monitoring of noble gas and/or clumped isotope signatures as part of the reservoir surveillance may provide an additional mechanism to proactively respond to changes with the production of the wellbore.

Figure 2:
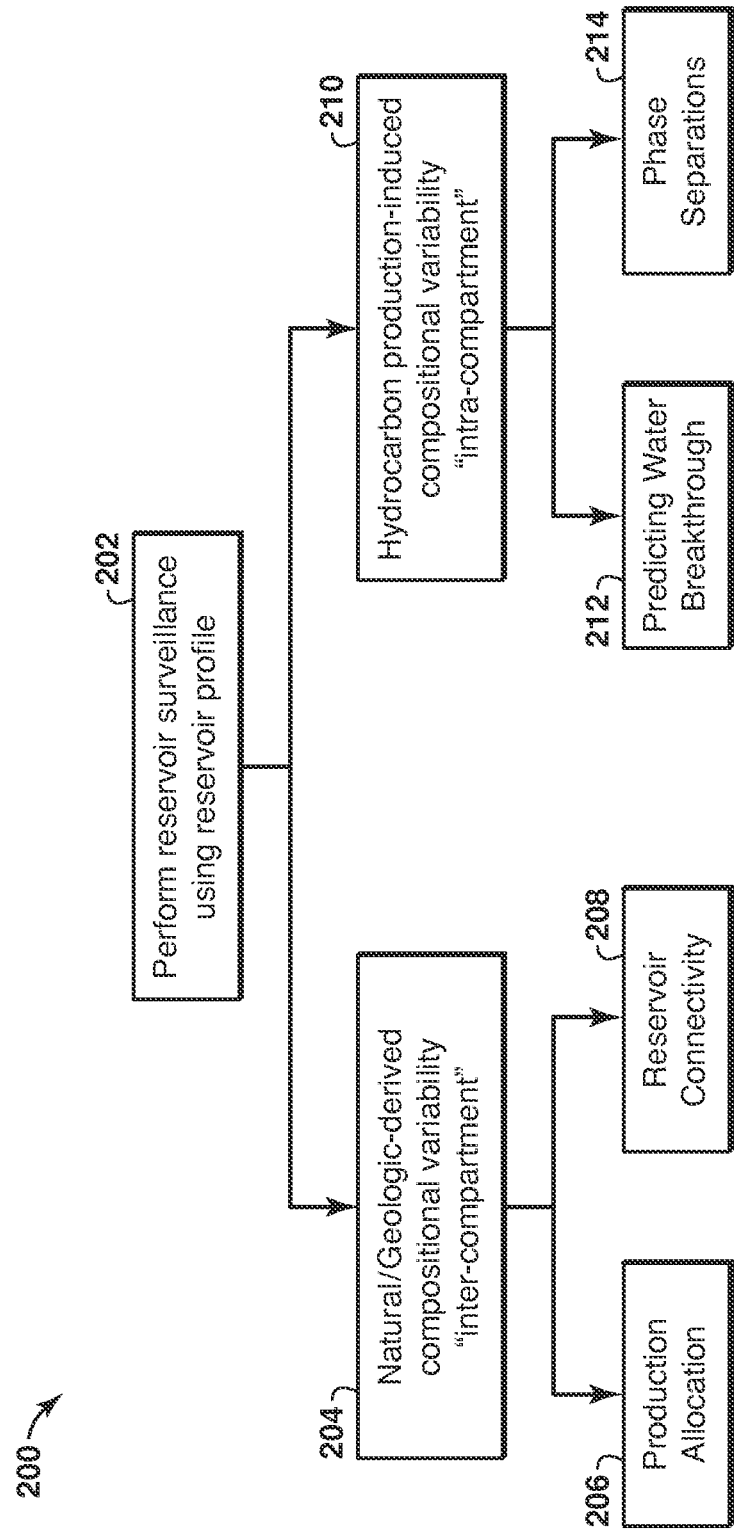
FIG. 2 is a flow diagram for utilizing different reservoir surveillance techniques in accordance with an exemplary embodiment of the present techniques.

The reservoir surveillance may be performed in a variety of different techniques. As an example, FIG. 2 is a flow diagram 200 for utilizing different reservoir surveillance techniques in accordance with an exemplary embodiment of the present techniques. In this flow diagram 200, the unique natural or hydrocarbon production-induced geochemical fingerprint for multiple regions of interest may be utilized to enhance the reservoir surveillance operations. In particular, the region of interest fingerprint, which may be determined as noted above in block 118 of FIG. 1, may be utilized as part of the reservoir surveillance operations. By using the region of interest fingerprints established in the reservoir profile, the reservoir surveillance may predict potential issues with the production of the wellbore based on the fingerprint for the different regions of interest, which may include one or more compartments, intervals, or reservoirs of interest. In addition, the reservoir surveillance may also be utilized to enhance the production allocations.

In this flow diagram 200, the reservoir surveillance is performed using region of interest fingerprint at block 202. The reservoir surveillance may be performed on the produced fluids (e.g., oil, gas and water), which are analyzed to determine the geochemical signatures, which is noted above in relation to block 122 of FIG. 1. The performance of the reservoir surveillance may include performing certain analyses based on the aspect being monitored. That is, certain tracers (e.g., geochemical signatures) may relate to natural/geologic-derived compositional variability (e.g., "inter-regional" aspects), which are discussed in blocks 204 to 208, while tracers may relate to hydrocarbon production-induced compositional variability (e.g., "intra-regional" aspects), which are described in blocks 210 to 214.

One aspect of reservoir surveillance relies on variability in the geochemical fingerprints of different regions of interest (e.g., compartments, intervals, reservoirs of interest), which may be referred to as inter-regional variability, that arises as a result of natural or geologic processes, as noted in block 204. These components of the fingerprint may be static (e.g., static reservoir of interest fingerprint) and may not change over production timescales. Examples of reservoir surveillance that rely on these natural or static fingerprints include, but are not limited to, production allocation, as noted in block 206, and reservoir connectivity analysis, as noted in block 208.

Another aspect of reservoir surveillance relies on the dynamic variability of the geochemical fingerprints (e.g., dynamic region of interest fingerprint) within individual regions of interest (e.g., compartment, interval, or reservoir of interest), which may be referred to as intra-regional variability, that arises during hydrocarbon production, as described in block 210. The components of the fingerprint are sensitive to chemical and/or physical processes, such as phase separation and degassing that occur due to changes in physical conditions, such pressure and temperature. Examples of reservoir surveillance that rely on these dynamic, hydrocarbon production-induced fingerprints include, but are not limited to, predicting water breakthrough, as described in block 212, and the early identification of in-reservoir phase separation, as described in block 214.

As noted above, the reservoir surveillance may utilize the variability in the geochemical fingerprints of different regions of interest, such as compartments, intervals, or reservoirs of interest, to enhance various inter-regional aspects, such as product allocation, reservoir connectivity and similar aspects and/or the intra-regional aspects, such as predicting water breakthrough and the early identification of in-reservoir phase separation. The changes in region(s) of interest fingerprints are utilized to perform inter-regional and intra-regional reservoir surveillance. This monitoring may measure changes in co-mingled fluids due to changes in the proportion of liquids, gases or water obtained from multiple compartments, intervals or reservoirs, which is compared with previously obtained samples or determined geochemical fingerprints. Specifically, these fingerprints may account for physical properties and geochemical signatures associated with each individual region. Physical characteristics or properties may include, but are not limited to, temperature and reservoir pressure. These measurements may be obtained from pressure volume temperature (PVT) samples or the like.

Figure 3:
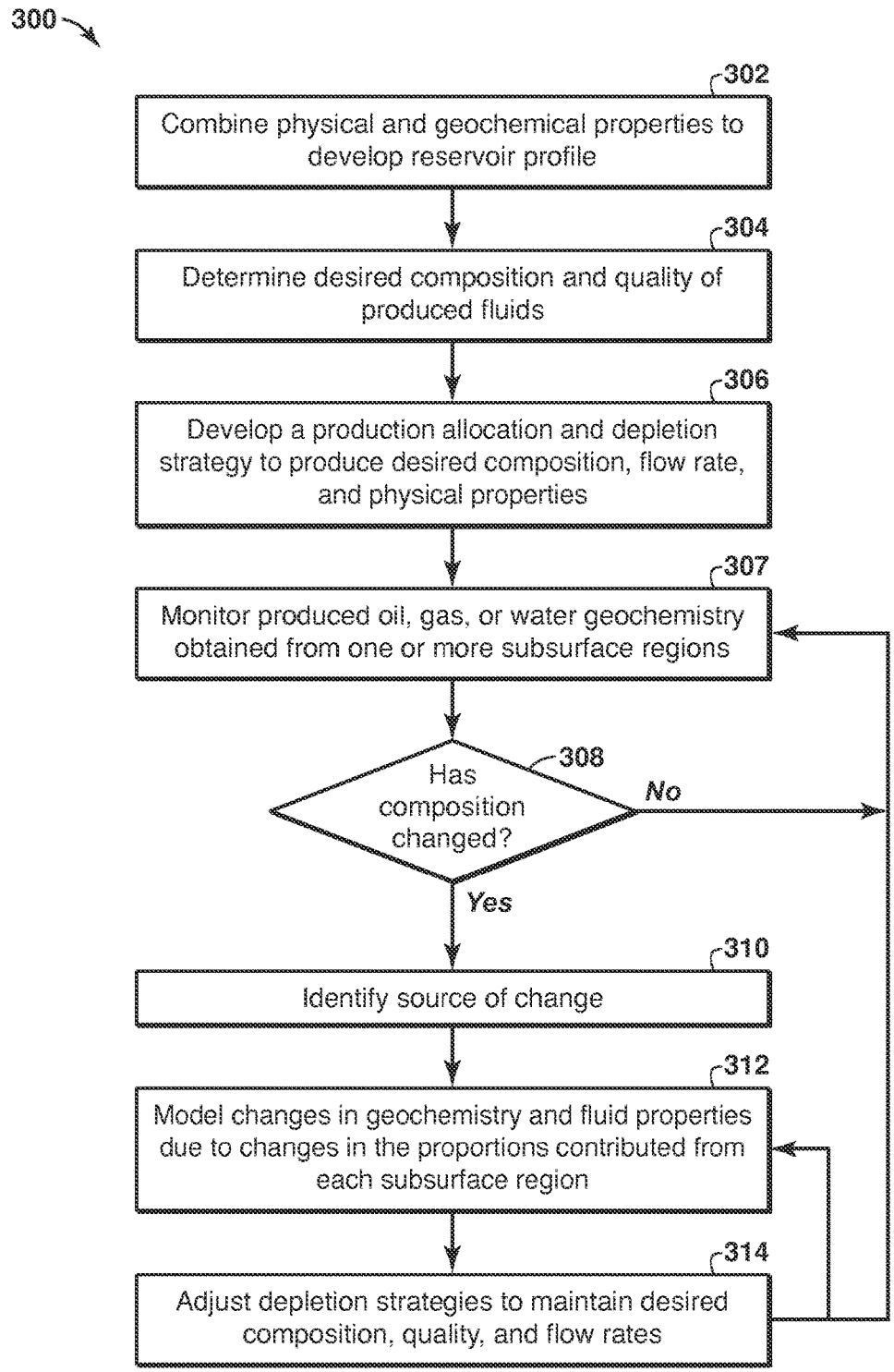
FIG. 3 is a flow diagram for utilizing static fingerprints from multiple regions of interest to conduct reservoir surveillance in accordance with an exemplary embodiment of the present techniques.

As an example, FIG. 3 is a flow diagram 300 for applying the geochemical fingerprint to reservoir surveillance in accordance with an exemplary embodiment of the present techniques. In this flow diagram 300, the changes in geochemical fingerprint are utilized to perform inter-regional reservoir surveillance. This method may include a development stage, which includes blocks 302 and 304, and a monitoring stage, which includes blocks 306 to 314.

The development stage, which includes blocks 302 and 304, may be utilized to develop the region of interest fingerprint and depletion strategy that accounts for multiple geochemical signatures. At block 302, physical properties and geochemical signatures may be combined to develop unique geochemical fingerprint for region of interest (e.g., an individual compartment, interval, or reservoir of interest). The individual fingerprint may be created for each of the different regions of interest (e.g., compartment, interval, or reservoir). Then, at block 304, a desired composition and quality of produced fluids (e.g., oil gas, and/or water) is determined. The desired composition and quality of produced fluids may be formulated and utilized as part of the depletion strategy. The depletion strategy is developed to provide a desired composition that accounts for desired hydrocarbon production (e.g., quantity and quality), limited production of less desired components (e.g., $H_2S$), as well as infrastructure and facilities tolerances. This depletion strategy may be accomplished by identifying the proportions of the different compartments, intervals, and/or reservoirs that contribute to the co-mingled produced fluid. Also, production from the individual compartments, intervals, or reservoirs may need to be adjusted to stay within the desired compositional ranges during the production time interval. The desired composition and quality may include the production of oil with a target API gravity, $H_2S$ concentration, asphaltene and wax content, acidity, gas-oil ratio, water-gas ratio, and the like.

After the development stage, a monitoring stage is performed, which includes blocks 306 to 314. At block 306, a production allocation and depletion strategy to produce desired composition, flow rate, and physical properties. The composition, flow rate and physical properties may include condensate-gas ratio, gas dryness, production pressures, and water yields. At block 307, physical properties comprising temperature and pressure may be monitored through the use of downhole sensors or at the surface during production. Still further at block 307, the produced fluid (oil, gas, and/or water) geochemistry is obtained from one or more subsurface regions (e.g., one or more compartments, intervals, and/or reservoirs) and may be monitored. The produced fluids may be obtained from either within the well bore (e.g. Modular Dynamic Test (MDT), or at the surface (e.g. at one or more separators that produce water, oil or gas). In some embodiments, these samples may be obtained within the wellbore and associated with the individual compartment, interval and/or reservoir, while other embodiments may include monitoring mixtures of produced fluids from different subsurface regions. The monitoring of physical properties and the sampling of these produced fluids may be performed at various times over the production time interval to provide data as to how the subsurface regions of interest are producing relative to the predicted contributions. Then, at block 308, a determination is made whether the geochemical fingerprint or physical properties has changed. The determination may include comparing the geochemistry fingerprint of the produced fluids to the original geochemical fingerprint for the produced fluids, which are part of the region of interest. The comparison may include calculating a change in one or more of the geochemical signatures in the produced fluid associated with the one or more of the different individual compartment, interval and/or reservoir. If no change in signatures has occurred, the process may continue to monitor physical properties and the geochemical fingerprint of produced fluids, as described in block 307.

If changes in composition have occurred, the source of the change may be identified, as noted in block 310. For example, when multiple regions of interest contribute to a produced fluid (co-mingled fluid), the monitoring of the geochemical fingerprint of the produced fluid may allow for the identification of an increase in the concentration of radiogenic noble gases that results from an increased contribution from one region of interest to the produced fluid. Then, at block 312, the changes in geochemistry signatures and fluid properties due to changes in the proportions contributed from each subsurface region may be modeled. The modeling may include corporation of one or more models of certain geochemical signatures or fluid properties (e.g., noble gas signatures pressure changes and Condensate Gas Ratio (CGR)). For example, an understanding of the static noble gas signature of different regions of interest can be used to quantify the relative contributions from different regions when deviations from the anticipated signature are identified in block 308. This information can be integrated with knowledge of the pressure regime of these different regions of interest. The sampling of these produced fluids at various intervals over the production time interval therefore may be utilized with the model to provide some additional information and data as to how the subsurface regions are producing relative to the predicted contributions. A model can then be used to determine the predicted fingerprint of a produced gas when changes are needed. At block 314, the depletion strategies may be adjusted to maintain desired composition, quality, and flow rates. This adjustment to the depletion strategy may be based on the determination of the models developed in block 312. That is, production from individual compartments, intervals, or reservoirs may be adjusted to stay within the desired geochemical fingerprint or physical property ranges of the depletion strategy.

Beneficially, while traditional reservoir surveillance techniques may not be able to distinguish different subsurface regions, the present techniques provide additional improvements to reservoir surveillance techniques that provide finer enhancements to the subsurface regions. That is, other reservoir surveillance techniques may rely on fewer tracers (e.g., biomarkers or gas geochemistry), and so the stable isotopic ($\delta^{13}C$, $\delta D$) and organic signatures of hydrocarbons associated with maturity, source facies, and in-reservoir alteration processes may not be unique to different regions within an area of interest. As a result, these techniques are not always able to distinguish components derived from the same source and that are of similar maturity and quality. In contrast, the isotopic signature of noble gases and the clumped isotope signature of hydrocarbons are particularly sensitive to small changes in temperature and composition of reservoir rocks, and provide unique geochemistry tracers (e.g., components within the reservoir profile or geochemical fingerprint). The present techniques thereby provide distinguishable tracers to distinguish the different subsurface regions. Furthermore, the noble gases and light hydrocarbon clumped isotope species are likely to undergo rapid equilibration within a single region and therefore have a homogeneous signature throughout the region. For example, within stacked and compartmentalized hydrocarbon reservoirs, where each compartment has a different average temperature, the clumped isotope signature of hydrocarbons are enriched relative to a random distribution. This enrichment is uniquely sensitive to the average temperature of the reservoir, and as such reflects the storage temperature of the given reservoir.

In contrast, the noble gas signature of any given region of interest within a reservoir rock uniquely reflects the grain size, porosity and permeability, composition (e.g., concentration of U, Th and K), and contact with formation water. This inherited signature may then be influenced by transport processes (e.g. dispersive verses diffusive) that operate on the noble gases that reflect the ability of the compartment to retain its hydrocarbons. Given the different ages and heterogeneous nature of sediments within reservoir rocks, the noble gas and clumped isotope signatures of hydrocarbons should be unique for individual compartments. Characterization of the unique signatures provides a mechanism to identify the contributions of different reservoirs to a produced fluid to be quantified in a co-mingled well.

The geochemical fingerprints described in the present techniques provide additional tools to resolve differences between the subsurface regions that are not possible given these traditional methods. That is, the comprehensive suite of newly available tracers is developed through the integration of traditional geochemical methods such as stable isotope geochemistry and biomarkers with clumped isotope and noble gas signatures in the context of the physical properties. This comprehensive geochemical fingerprint of a region of interest, coupled with statistical methods or modeling approaches, provides far more opportunities to identify subtle changes in the co-mingled produced fluids, associated with differential contributions from specific compartments, intervals, or reservoirs, prior to significant changes in the production stream. Accordingly, depletion strategies and reservoir management can then be adjusted to maintain desired compositions, quality and flow rates.

Figure 4:
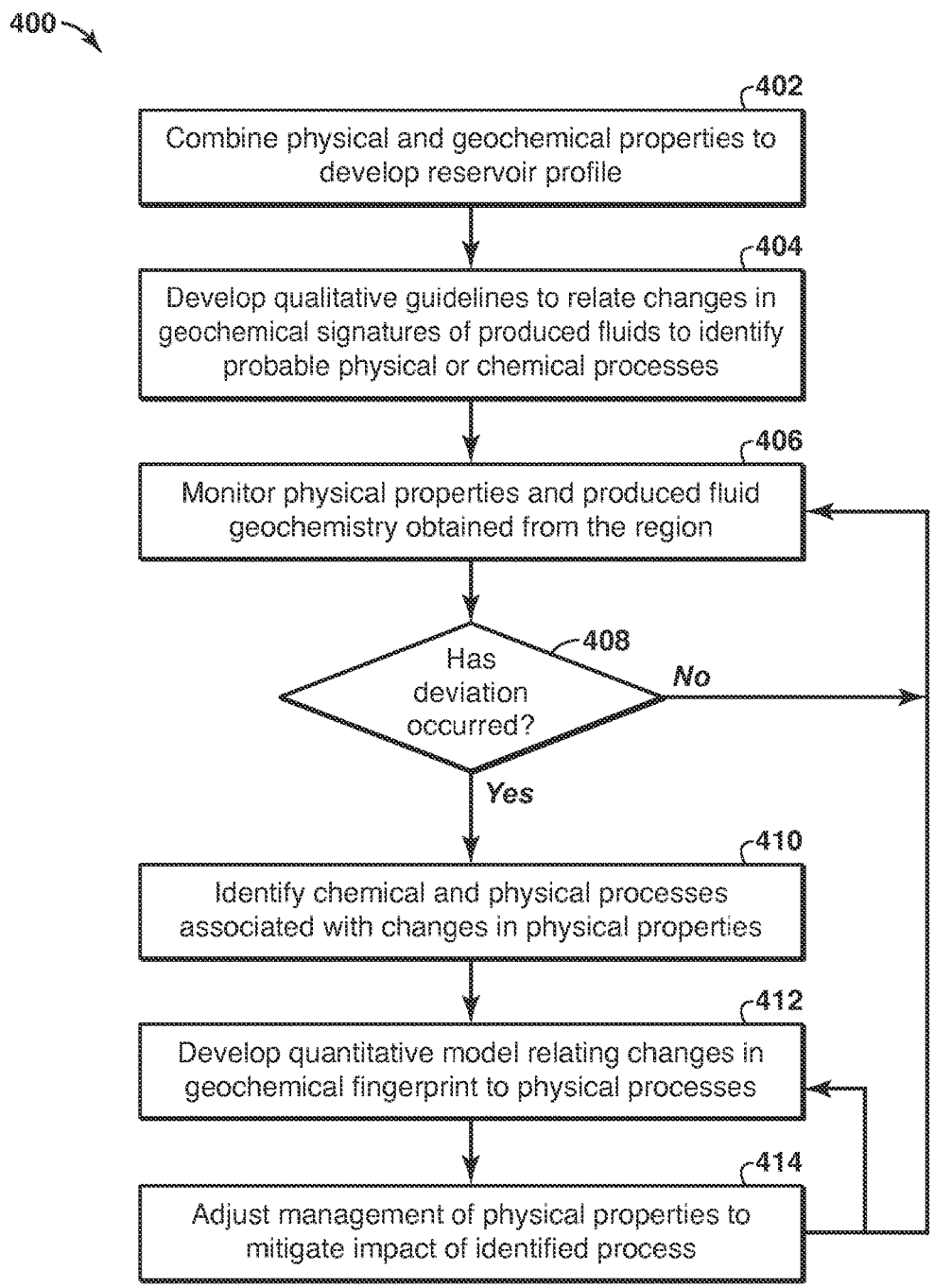
FIG. 4 is an alternative flow diagram for utilizing a dynamic change in the fingerprint of an individual or single region of interest to conduct reservoir surveillance in accordance with an exemplary embodiment of the present techniques.

As another example, FIG. 4 is an alternative flow diagram 400 for applying the geochemical fingerprint to conduct reservoir surveillance in accordance with an exemplary embodiment of the present techniques. In this flow diagram 400, the introduction of noble gases and clumped isotopes, as described above, provides additional tracers for conducting dynamic reservoir connectivity analysis through the temporal monitoring of produced geochemical fingerprints. These changes in the geochemical fingerprint are utilized to perform intra-regional reservoir surveillance. That is, the workflow provides a mechanism for proactive intra-regional reservoir surveillance. This reservoir surveillance monitors changes in the geochemical fingerprint of individual regions of interest to identify responses in the geochemical fingerprint that arise from the early onset of chemical or physical processes within the reservoir. The method may include a development stage, which includes blocks 402 and 404, and a monitoring stage, which includes blocks 406 to 414.

The development stage, which includes blocks 402 and 404, may be utilized to develop the region of interest fingerprint and depletion strategy that accounts for the geochemical fingerprint. At block 402, physical properties and geochemical signatures may be combined to develop unique geochemical fingerprint for an individual region of interest (e.g., compartment, interval, or reservoir). The individual fingerprint may be created for each of the different regions of interest. The geochemical fingerprint of the individual region (e.g., compartment, interval or reservoir) is combined or integrated with the physical observations that include, but are not limited to, temperature and reservoir pressure. These measurements may be obtained from PVT samples or the like. Then, at block 404, qualitative guidelines are developed to relate changes in geochemical signatures of produced fluids (e.g., gas) to identify probable physical or chemical processes. The qualitative guidelines may provide one or more guidelines of different scenarios of events. This aspect may include the development of a series of qualitative guidelines that link chemical or physical processes, such as water breakthrough, phase separation, or acid-rock interaction to changes in the produced fluid fingerprint. As an example, the reservoir surveillance may monitor the wellbore for changes in noble gas signature. The elemental fractionation patterns in the noble gas signatures of produced gases may be monitored and utilized to indicate certain identified processes, such as water breakthrough or phase separation. For instance, the noble gas signature of produced hydrocarbons preserves a signature that can be used to identify interaction of the hydrocarbon phase with formation waters that are rich in atmospheric noble gases. As an initial point, the concentration of noble gases in a natural gas is a function of three variables: (i) the initial concentration and isotopic signature of noble gases in the water phase, (ii) the solubility of noble gases in water and oil (solubility of noble gases in oil is controlled by oil quality), and (iii) the ratio of the volumes of oil/water, gas/water or gas/oil/water. Given the relation between the three variables, any change in the oil/water, gas/water or gas/oil/water ratio drives a change in the noble gas signature of the gas phase.

As another example, phase separation may occur during production. The production of a gas phase could arise during pressure decrease in an oil phase or liquid drop could occur during pressure decrease within a gas phase. The noble gases fractionate between gas and liquid phases based on their relative solubilities. Light noble gases are less soluble than heavy noble gases, which results in light noble gases becoming dominant in the gas phase (e.g., He and Ne) and heavy noble gases (e.g., Kr and Xe) dominating the liquid hydrocarbon phase (oil or condensate). This results in a fractionation in the elemental patterns of a noble gas signature of the liquid hydrocarbon and the gas phase.

After the development stage, a monitoring stage is performed, which includes blocks 406 to 414. At block 406, physical properties and produced fluids (e.g., oil, gas, or water) geochemical fingerprints obtained from the region (e.g., compartment, interval or reservoir) may be monitored. The produced fluids may be obtained from either within the well bore (e.g. Modular Dynamic Test (MDT), or at the surface (e.g. at one or more separators that produce water, oil or gas). In some embodiments, these samples may be obtained within the wellbore and associated with the individual compartment, interval and/or reservoir, while other embodiments may include monitoring mixtures of produced fluids from different subsurface regions. Then, at block 408, a determination whether a deviation has occurred. The deviations in one or more of the physical properties or geochemical signatures of the original geochemical fingerprint may be identified through comparisons of the monitored data with the geochemical fingerprint developed for the static region of interest fingerprint. The deviations may include changes in one or more of the components (e.g. noble gases, clumped isotopes, stable isotopes) in the produced fluid associated with the one or more of the different individual compartment, interval and/or reservoir. For example, the noble gas signature in the geochemical fingerprint may indicate an increase in the contribution of atmospheric, water-derived noble gases within the region of interest. This increase in atmospheric, water derived noble gases may result from the degassing of a water phase due to an increase in the water volume as noble gas concentrations are dependent on the volume ratio of hydrocarbons to water. This indicates the potential for water breakthrough at the well head. If no deviation has occurred, the process may continue to monitor physical properties and produced fluid fingerprints, as described in block 406.

If deviations occur, the chemical and physical processes associated with changes in the chemical fingerprint or physical properties may be identified, as noted in block 410. As an example, the qualitative guideline developed in in block 404 may be used to identify which physical or chemical processes may be responsible for the identified change. Then, at block 412, one or more quantitative models relating changes in geochemical fingerprint to physical processes may be developed. The quantitative models may include models of certain signatures (e.g., noble gas signatures, stable isotopes, bulk composition). The comprehensive quantitative model may be developed to model the dynamic interactions that link changes in geochemistry to physical and chemical processes (e.g. pressure changes impact condensate/gas ratios). For example, when the comparison of the deviation from the region of interest fingerprint identified in block 408 with the qualitative model developed in block 404 identifies a particular process occurring within the reservoir, a model may be developed to quantitatively assess the impact (for example, in terms of volume increase/decrease of a particular phase) within the reservoir. At block 414, the management of physical properties may be adjusted to mitigate impact of identified process. This adjustment may be based on the quantitative models and/or the identified chemical and physical processes.

As one example, the noble gases in the water phase are dominated by atmospheric noble gases. When pressure is drawn down in a producing reservoir, the volume of water within the reservoir may increase to maintain pressure when, for example, there is an active water drive. The velocity or transport of gas within the reservoir exceeds the velocity that water can migrate within the reservoir. As such, produced gases may be drawn from distal sections of the reservoir that were initially in contact with water at a rate that exceeds that at which formation waters can migrate within the subsurface. A progressively increasing signature of atmospheric-derived noble gases and "water-like" bulk isotope signatures suggest an increased volume of water within the reservoir.

In this embodiment, a water breakthrough scenario is identified as the process responsible for deviations from the region of interest fingerprint through monitoring in block 406 and comparison with the qualitative models developed in block 404. A model is then developed to quantify the increase in volume of water within the reservoir that has yet to breakthrough at the well bore. This breakthrough of water at the well bore could impact production of hydrocarbons. A quantitative model is developed in block 412 that calculates the volume of water present within the reservoir from the concentration of atmospheric noble gases in the gas or water phase measured in block 406. This model may also provide a range of volumes for a range of atmospheric noble gas concentrations so that a trend of increasing or decreasing water volume can be identified. This signature may be used to predict a pending increase in formation water cut to produce fluids in advance of the water phase migrating to the well. This information could be used to take preemptive action by altering flow conditions (e.g., by choking back production pressure) to prevent or limit the volume of water being produced from the formation. Accordingly, the observation of an increased contribution of water derived noble gases in a produced gas provides early warning of a pending water breakthrough ahead of the water phase reaching the well, which may be identified by water soluble tracers.

As another example, if liquid drop out is identified as the physical process producing changes in the geochemical fingerprint in block 410, this method may provide early detection of small volumes of condensate produced within the reservoir. A quantitative model developed in block 412 may provide the volume of condensate produced in the reservoir to be determined through measurement of the noble gas concentrations of the produced gas. The flow rate of the well can then be reduced to maintain pressure within the reservoir and prevent further liquid drop out within the reservoir. The produced gas composition may then continue to be monitored to identify any further changes in the geochemical fingerprint.

As yet another example, when a deviation in the fingerprint is identified in block 408 from that of the geochemical fingerprint of the region of interest developed in block 402, a process such as phase transformation is identified in block 410 through comparison with the qualitative model in block 404. This change may be recorded by a change in the noble gas signature of the produced hydrocarbon. When this phase transformation is related to the formation of a gas cap within a region of interest that may be driven by a decrease in pressure within an oil reservoir, a model is developed in block 412 that quantifies the volume of gas formed. The noble gas signature of the produced oil may display a fractionated signature. In particular, the noble gas signature in the oil phase may be depleted in light noble gases and relatively enriched heavier noble gases as a result of the solubility differences between the different noble gases. The model in block 412 uses the extent of fractionation of the noble gas signature to determine the volume of gas produced. The model also provides for predictions to be made of volume increase or decrease with time during production by considering the potential changes in noble gas signature of the produced hydrocarbons. This reservoir surveillance method may identify the formation of a gas cap before production of gas at the well and provide a method for predicting changes in the gas/oil ratio that may be produced from the region of interest.

As yet another application, this method of reservoir surveillance can be utilized to quantify remaining in place hydrocarbons at different stages of production from a region of interest. When a deviation in the fingerprint is identified in block 408 from that of the geochemical fingerprint of the region of interest developed in block 402, a process such as a decrease in a volume of hydrocarbon within a region of interest (gas, oil or gas and oil) is identified in block 410 through comparison with the qualitative model in block 404. This change may be recorded by a change in the noble gas signature of the produced fluids. When this phase transformation is related to a volume decrease in one or more of gas and oil and/or a change in the volume of water within a region of interest resulting from production, a model is developed in block 412 that quantifies these volumetric changes. The noble gas signature of the produced oil and/or gas and/or water may display a fractionated signature. In particular, when the volume of oil or gas is decreased in an oil-water or gas-water system, or both gas and oil are depleted at the same rate (e.g. maintaining the gas-oil ratio) the concentration of atmospheric noble gases increase in each of the hydrocarbon phases as a result of the decrease in the hydrocarbon/water volume ratio. When the gas oil ratio changes during production in a gas-oil-water system, the noble gas signature of each hydrocarbon phase displays a fractionated noble gas signature consistent with the modified volume ratio over time. For example, as gas is depleted within a region of interest, and gas/oil ratio decreases, the fractionation pattern in the gas phase may approach that of the oil phase as a result of the solubility differences between the different noble gases. The model in block 412 uses the extent of fractionation of the noble gas signature to determine the remaining volume of gas and oil within the region of interest. The model may also allow for predictions to be made of volume decreases in the hydrocarbons with time during production by considering the potential changes in noble gas signature of the produced hydrocarbons. This may be also reflected in the noble gas signature of the water as discussed in the water breakthrough example. This reservoir surveillance method therefore allows for a quantitative estimate of the remaining hydrocarbon phase to be made and depletion strategies optimized for these volumetric changes during production from the region of interest.

As yet another application, this method of reservoir surveillance can be utilized to evaluate and quantify the efficiency of injection of surface or produced waters maintaining in reservoir pressure and the production of hydrocarbons from within the region of interest. The geochemical fingerprint for the region of interest developed in block 402 is established prior to the injection of large volumes of fluids. The primary production of the reservoir can result in a decrease in reservoir pressure and hence the flow of hydrocarbons from the region of interest. In such cases, produced water or surface water may be injected to the region of interest to develop and maintain a pressure sufficient for the continued production of hydrocarbons from that region. The injected fluids have a different signature to that of typical subsurface waters. In particular, this injected fluid may be depleted in radiogenic noble gases compared to subsurface waters. When injected this fluid may mix with subsurface fluids and contact hydrocarbons. This contact results in further partitioning of noble gases from water to hydrocarbon phases. As the volume of the injected fluid increases in the subsurfaces, the radiogenic noble gas concentration in the mixed water in the region of interest decreases. This results in a subsequent decrease in the radiogenic noble gases in the hydrocarbon phase in contact with this fluid. A decrease in the radiogenic noble gas signature monitored in block 406 may be identified in block 408. Through comparison of the produced fingerprint with qualitative in block 404, water injection is identified as the process responsible for the change in block 410. A model developed in block 412 can quantify the volume of injected water that has contributed to this change. Comparison of the quantified volume with the total volume of injected fluid allows an efficiency of water injection to be determined. The continual injection of water for pressure maintenance results in a decrease in the gas-water and/or oil-water ratios, resulting in hydrocarbon phases that more closely match the noble gas signatures of the injected water (increased atmospheric contribution) with a decrease in the radiogenic noble gas because of subsequent dilution by injected water.

In one or more embodiments, the method of performing integrated geochemical and physical techniques for reservoir surveillance may include the geochemical variability, such as inter-region or intra-regional, identified through integration of clumped isotope geochemistry and/or noble gas geochemistry characterization with other geochemical and physical properties. The method may include obtaining data from sensors by monitoring the produced fluids (e.g., temporal) and monitoring physical changes within subsurface regions. The reservoir surveillance may be utilized for intra-regional applications, which may include, but are not limited to, identification of water breakthrough prior to production of water above a threshold at well and/or phase transformation (e.g. liquid drop out). The reservoir surveillance may be utilized for inter-region applications by applying static/geologic (natural) unique compositions of individual reservoir/compartments to identify deviations from intended mixing proportions over time, which may include, but are not limited to, production allocation and reservoir connectivity.

Further, in one or more embodiments, the inter-region and intra-regional variability techniques may be combined into a larger composite workflow to identify both the variability in mixing proportions from static compositions and changes in mixed reservoir systems and intra-reservoir production induced changes to optimize long-term field productivity and producibility. That is, a depletion strategy may be developed based on the unique geologic/natural geochemical fingerprints of the regions of interest to produce hydrocarbons of a specific quality (e.g., dry gas) and composition (e.g., condensate gas ratio). Then, the reservoir surveillance may be conducted to monitor composition and/or quality and verify operation of the depletion strategy and adjust production allocation to provide consistent compositions to facilities during time lapse or four dimensional reservoir surveillance.

In one or more embodiments, the samples (e.g., produced fluids) may be analyzed for noble gas signatures and/or clumped isotope signatures. This measurement may include the analysis of noble gas signatures (He, Ne, Ar, Kr and Xe) and the isotopologue or clumped isotope signature of both non-hydrocarbon and hydrocarbon molecules (in gases, water, or oils). The sample of interest may comprise water, oil, natural gas, sediments or other type of rock, or fluids present in sediments, rocks, water or air. Measurement of the abundance of each noble gas isotope can be conducted following standard extraction techniques using mass spectrometry. Measurement of the abundance of each clumped isotope or isotopologue can be conducted using multiple techniques, such as mass spectrometry and/or laser-based spectroscopy. Molecular and isotopic signatures of non-hydrocarbon gases (e.g., $H_2S$, $CO_2$, $N_2$) and hydrocarbons are typically measured in the produced fluids. Standard molecular analyses are conducted to characterize the organic signature of hydrocarbons extracted from the sample. This may include gas chromatography-mass spectrometry (GC/MS), GC/GC/MS, liquid chromatography. Inorganic analysis of samples may also be conducted. This may include but is not restricted to inductively coupled plasma mass spectrometry (ICP-MS) and ICP-optical emission spectroscopy. Gas chemistry analysis may also be conducted and may include isotope ratio-mass spectrometry and GC.

The interpretation of advanced molecular and isotopic signatures, including noble gas signatures and clumped isotope signatures of hydrocarbon and non-hydrocarbon molecules, may also be performed and incorporated into a region of interest geochemical fingerprint. As an example, the noble gases may be utilized to determine hydrocarbon type and volume as described in a U.S. Patent No. 61/616,813. As natural gases and oils are initially devoid of noble gases, the addition of these through interaction with formation water provides information about the samples. The impact of this interaction on isotopic ratios and absolute concentrations of noble gases present in the hydrocarbon phase is a function of three variables, the solubility of noble gases, the initial concentration in the water phase, and the volume ratio of hydrocarbon to water. The initial concentration of noble gases in the water phase prior to interaction with any hydrocarbons can be accurately measured or estimated. Noble gases dissolve in water during recharge from meteoric waters or at the air/water boundary for seawater. This initial signature is therefore dominated by atmospheric noble gases, namely $^{20}Ne$, $^{36}Ar$, $^{84}Kr$ and $^{132}Xe$. The amount of noble gases that dissolve into the water phase obeys Henry's Law, which states that the amount of noble gases dissolved in water is proportional to the partial pressure of the noble gases in the atmosphere (which varies as a function of altitude for meteoric water recharge). The Henry's constant is directly related to the salinity of the water phase and the ambient temperature during the transfer of noble gases to the water. Formation waters recharged from meteoric waters at the air/soil interface may have an additional component of atmospheric derived noble gases from that which is expected purely from equilibrium, "excess air". These influences may be subject to adjustments (e.g., correction schemes, such as those noted in Aeschbach-Hertig et al., 2000, for example). See, e.g., Aeschbach-Hertig, W., Peeters, F., Beyerle, U., Kipfer, R. Palaeotemperature reconstruction from noble gases in ground water taking into account equilibrium with entrapped air. Nature, 405, 1040-1044, 2000. The resulting noble gas signature is therefore lie between air-saturated water (ASW), air-saturated seawater (ASSW) and air-saturated brine (ASB) for any given temperature. Radiogenic noble gases are then introduced following recharge through radioactive decay of minerals within the subsurface. The concentration of the radiogenic noble gases typically increases with increasing formation water residence time (or age). This evolving noble gas signature in the water phase is changed as a result of mixing and interaction with other fluids.

The solubilities of noble gases in water have been determined for a range of different temperatures, as is known in the art (e.g., Crovetto et al., 1982; Smith, 1985). See, e.g., Smith, S. P. Noble gas solubilities in water at high temperature. EOS Transactions of the American Geophysical Union, 66, 397, 1985 and Crovetto, R., Fernandez-Prini, R., Japas, M. L. Solubilities of inert gases and methane in H2O and D2O in the temperature range of 300 to 600K, Journal of Chemical Physics 76(2), 1077-1086, 1982. Similarly, the measured solubility of noble gases in oil increases with decreasing oil density (Kharaka and Specht, 1988). See, e.g., Kharaka, Y. K. and Specht, D. K. The solubility of noble gases in crude oil at 25-100° C. Applied Geochemistry, 3, 137-144, 1988. The exchange of atmospheric noble gases between formation water and both the oil and/or gaseous hydrocarbon phase can occur through various processes, and the extent of fractionation induced by each of these processes gives rise to different signatures in the different phases. These processes can be modeled and may comprise equilibrium solubility, Rayleigh style fractionation and gas stripping. The exchange of noble gases between oil and water may result in the oil phase developing an enrichment in the heavy noble gases (Kr and Xe), and an associated depletion in the light noble gases (He and Ne) relative to the water phase. This is because of the greater solubility of the heavier noble gases in oil than in water. In contrast, the interaction of a gas phase with water may result in the gas phase becoming relatively enriched in the lighter noble gases and depleted in the heavy noble gases relative to a water phase. The magnitude of this fractionation may change depending upon the exchange process involved and on the density of the oil phase The noble gases provide a conservative tracer of the hydrocarbon type present within the subsurface (oil vs. gas). Finally, given that two of the three variables that control the exchange of noble gases between water and hydrocarbons are known or can be modeled, the hydrocarbon/water volume ratio within a subsurface hydrocarbon accumulation can be determined. From this it is possible to quantitatively predict the volume of hydrocarbon present within a subsurface accumulation and the volume of water, which may be compared with other model data.

In addition to the utilization of noble gases to determine hydrocarbon accumulation volume, and hydrocarbon type, the clumped isotope geochemistry may be utilized to determine the depth of a producing region of interest. As an example, U.S. Patent No. 61/558,822 describes a process for determining the clumped isotope signature of any molecule. The clumped isotope signature of any molecule is a function of (i) temperature-independent randomly populated processes (e.g., stochastic distribution) and (ii) thermal equilibrium isotopic exchange. The latter process is controlled or dependent on the surrounding temperature. The stochastic distribution of any isotopologue can be determined from the bulk isotope signatures of the species from which it derives. For example, determining the stochastic distribution of isotopologues for methane requires knowledge of the 13C and D signatures of methane.

The expected increased abundance, or enrichment, of any given isotopologue or clumped isotope can be modeled or empirically determined for any given temperature. By measuring the clumped isotope and isotopologue signatures of a given molecule, and through knowledge of the stochastic distribution, the enrichment of the measured concentrations relative to the stochastic distribution can be used to determine the temperature in the subsurface from which this molecule is derived.

Figure 5:
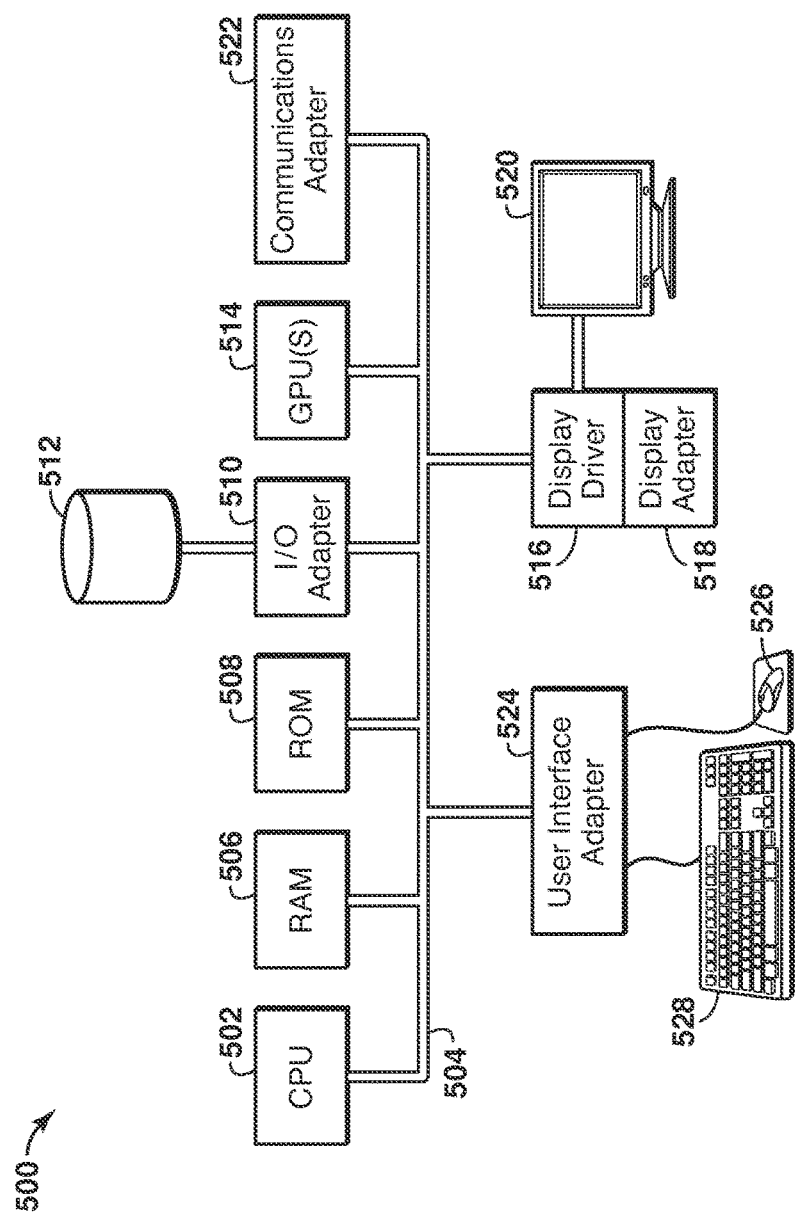
FIG. 5 is a block diagram of a computer system according to disclosed methodologies and techniques.

Hydrocarbons that derive from a region of interest may retain a clumped isotope signature that more reflects the temperature at which the hydrocarbons were stored in the subsurface. This non-kinetic control on the isotopic exchange reactions in isotopologues of hydrocarbons that originate from a subsurface accumulation arises as a result of the inherently long residence times of hydrocarbons in the subsurface. FIG. 5 is a block diagram of a computer system 500 that may be used to perform any of the methods disclosed herein. A central processing unit (CPU) 502 is coupled to system bus 504. The CPU 502 may be any general-purpose CPU, although other types of architectures of CPU 502 (or other components of exemplary system 500) may be used as long as CPU 502 (and other components of system 300) supports the inventive operations as described herein. The CPU 502 may execute the various logical instructions according to disclosed aspects and methodologies. For example, the CPU 502 may execute machine-level instructions for performing processing according to aspects and methodologies disclosed herein.

The computer system 500 may also include computer components such as a random access memory (RAM) 506, which may be SRAM, DRAM, SDRAM, or the like. The computer system 500 may also include read-only memory (ROM) 508, which may be PROM, EPROM, EEPROM, or the like. RAM 506 and ROM 508 hold user and system data and programs, as is known in the art. The computer system 500 may also include an input/output (I/O) adapter 510, a communications adapter 522, a user interface adapter 524, and a display adapter 518. The I/O adapter 510, the user interface adapter 524, and/or communications adapter 522 may, in certain aspects and techniques, enable a user to interact with computer system 500 to input information.

The I/O adapter 510 preferably connects a storage device (s) 512, such as one or more of hard drive, compact disc (CD) drive, floppy disk drive, tape drive, etc. to computer system 500. The storage device(s) may be used when RAM 506 is insufficient for the memory requirements associated with storing data for operations of embodiments of the present techniques. The data storage of the computer system 500 may be used for storing information and/or other data used or generated as disclosed herein. The communications adapter 522 may couple the computer system 500 to a network (not shown), which may enable information to be input to and/or output from system 300 via the network (for example, a wide-area network, a local-area network, a wireless network, any combination of the foregoing). User interface adapter 524 couples user input devices, such as a keyboard 528, a pointing device 526, and the like, to computer system 500. The display adapter 518 is driven by the CPU 502 to control, through a display driver 516, the display on a display device 520. Information and/or representations of one or more two-dimensional (2D) canvases and one or more three-dimensional (3D) windows may be displayed, according to disclosed aspects and methodologies.

The architecture of system 500 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In one or more embodiments, the method any one of FIGS. 1 to 4 may be implemented in machine-readable logic, set of instructions or code that, when executed, performs a method to manage hydrocarbon production by performing reservoir surveillance through the use of quantitative models comprised of clumped isotope, noble gas data, or the combination of clumped isotope and noble gas data. This executable code may also include quantitative models comprised of traditional geochemical signatures and physical properties observed within the region of interest. The quantitative models developed in block 412 is developed and the code may be used or executed with a computing system, such as computing system 500.

As an example, the present techniques may include a computer system having a process or and memory, where a set of instructions is stored on the memory and accessible by the process. The set of instructions are configured to use of integrated geochemical and physical techniques for reservoir surveillance.

In one or more embodiments, the method may include storing and utilizing intra-regional geochemical variability (e.g., identified through integration of clumped isotope geochemistry, noble gas geochemistry characterization with conventional geochemical and physical properties) arising from dynamic/production (temporal) induced physical changes within region of interest, which may be used to identify water breakthrough prior to production of water at well, and phase transformation (e.g. liquid drop out).

The inter-regional geochemical variability (identified through integration of clumped isotope geochemistry, noble gas geochemistry characterization with conventional geochemical and physical properties) by applying static/geologic (natural) unique compositions of individual regions to identify deviations from intended mixing proportions over time, which may include production allocation and reservoir connectivity. Further, the inter and intra region variability techniques may be combined into a larger composite workflow to identify both variability in mixing proportions from static compositions and changes in mixed reservoir system from intra-reservoir production induced changes to ensure optimized long term field productivity and producibility.

Illustrative, non-exclusive examples of methods and products according to the present disclosure are presented in the following non-enumerated paragraphs. It is within the scope of the present disclosure that an individual step of a method recited herein, including in the following enumerated paragraphs, may additionally or alternatively be referred to as a "step for" performing the recited action.

1. A method of producing hydrocarbons comprising: obtaining a sample from one of the one or more subsurface regions in a subsurface hydrocarbon accumulation; interpreting the sample to determine of one or more of a noble gas signatures and a clumped isotope signatures for the obtained samples; generating a region of interest fingerprint having one or more of a noble gas signature and a clumped isotope signature for the obtained samples; producing fluids from the one of the one or more subsurface regions, wherein the produced fluids comprise hydrocarbons; and performing reservoir surveillance on the produced fluids from the one of the one or more subsurface regions.

2. The method of paragraph 1, wherein performing reservoir surveillance on the produced fluids further comprises: obtaining a first sample from the produced fluids; determining a first sample fingerprint for the obtained first sample, wherein the first sample fingerprint comprises one or more of a noble gas signature and a clumped isotope signature; comparing the first sample fingerprint to the region of interest fingerprint; and determining whether the first sample fingerprint has changed based on the comparison of the region of first sample fingerprint with the region of interest fingerprint.

3. The method of paragraph 1, wherein performing reservoir surveillance on the produced fluids further comprising: obtaining a second sample from the produced fluids, wherein the second sample is obtained a period of time after the obtaining of the first sample; determining a second sample fingerprint for the obtained second sample, wherein the second sample fingerprint comprises one or more of a noble gas signature and a clumped isotope signature; comparing the second sample fingerprint to the region of interest fingerprint; and determining whether the second sample fingerprint has changed based on the comparison of the second sample fingerprint with the region of interest fingerprint.

4. The method of paragraph 2, wherein the comparison is between the first sample fingerprint and a static fingerprint for the regions of interest to determine inter-region changes.

5. The method of paragraph 2, wherein the comparison is between the first sample fingerprint and a dynamic fingerprint for the regions of interest to determine intra-regional changes.

6. The method of paragraph 1, further comprising developing a depletion strategy based on the region of interest fingerprint to produce hydrocarbons of a specific quality and composition.

7. The method of any one of paragraphs 1 to 6, wherein determining the noble gas signature comprises: measuring or modeling an initial concentration of atmospheric noble gases present in formation water in contact with the subsurface hydrocarbon accumulation; modifying the measured/modeled initial concentration by accounting for ingrowth of radiogenic noble gases during residence time of the formation water; measuring concentrations and isotopic ratios of atmospheric noble gases and radiogenic noble gases present in the sample; comparing the measured concentrations and isotopic ratios of the atmospheric noble gases and the radiogenic noble gases present in the sample to the measured/modified modeled concentrations of the formation water for a plurality of exchange processes; determining a source of hydrocarbons present in the sample; comparing an atmospheric noble gas signature measured in the hydrocarbon phase with the measured/modified modeled concentration of the atmospheric noble gases in the formation water for the plurality of exchange processes; and determining at least one of a presence of a subsurface hydrocarbon accumulation, a type of hydrocarbons in the subsurface accumulation and a hydrocarbon/water volume ratio in the subsurface accumulation prior to escape to the surface, and a volume of the subsurface accumulation.

8. The method of paragraph 7, wherein the plurality of exchange processes include at least one of equilibrium solubility laws calibrated to reflect conditions in the subsurface accumulation, Rayleigh-style fractionation to represent the de-gassing of an oil phase, and gas stripping to represent enrichment in a gas phase. 8. The method of paragraph 8, wherein the conditions include at least one of reservoir temperature, pressure, formation water salinity and oil density.

9. The method of paragraph 7, wherein the noble gases include at least one of helium (He), neon (Ne), argon (Ar), krypton (Kr), and xenon (Xe).

10. The method of paragraph 7, wherein the isotopic ratios include a ratio of Kr to Ar, which may include the ratio of Kr to Ar as a ratio of $^{84}Kr/^{36}Ar$.

11. The method of paragraph 7, wherein the isotopic ratios include a ratio of Xe to Ar, which may include the ratio of Xe to Ar as a ratio of $^{132}Xe/^{36}Ar$.

12. The method of paragraph 7, wherein the isotopic ratios include a ratio of Ne to Ar, which may include the ratio of krypton to argon is a ratio of $^{20}Ne/^{36}Ar$.

13. The method of paragraph 7, further comprising producing hydrocarbons based on at least one of the determined type, hydrocarbon/water volume ratio, and the volume of the subsurface accumulation.

14. The method of paragraph 7, wherein the initial concentration is modeled to reflect a salinity of the fluid and temperature of exchange during recharge/exchange with atmosphere.

15. The method of paragraph 7, wherein the sample comprises one of water, oil, natural gas, sediments, rock, fluids present in sediments, fluids from rock pores, and fluids trapped in fluid inclusions.

16. The method of paragraph 7, further comprising characterizing non-hydrocarbon gas risk associated with the subsurface hydrocarbon accumulation.

17. The method of any one of paragraphs 1 to 6, wherein determining the noble gas signature comprises: analyzing the sample to determine a geochemical signature of the sample; determining an initial concentration of atmospheric noble gases present in formation water in contact with the subsurface hydrocarbon accumulation; modeling ingrowth of radiogenic noble gases to modify the initial concentration for given formation water residence times; determining a residence time of the formation water; determining an extent of interaction with a hydrocarbon phase; determining the origin of the sample; determining at least one of a type, and hydrocarbon/water volume ratio when the origin of the sample is a hydrocarbon accumulation; and from the hydrocarbon/water volume ratio, determining the volume of the hydrocarbon accumulation.

18. The method of any one of paragraphs 1 to 6, wherein determining the noble gas signature comprises: determining an initial concentration of atmospheric noble gases present alongside a hydrocarbon species; modeling a range of expected concentrations of atmospheric and radiogenic noble gases present in the sample for a range of residence times and for various extents of interaction between formation water and a hydrocarbon phase; measuring concentrations and isotopic ratios of noble gases present in the sample; comparing the measured noble gas concentrations with the modeled range of expected concentrations of atmospheric and radiogenic noble gases; determining, using the comparison, whether the hydrocarbons present in the sample have escaped from the subsurface accumulation; estimating, from the measured noble gas concentrations and the modeled range of expected concentrations of atmospheric and radiogenic noble gases, the type and quality of hydrocarbons in the subsurface accumulation and the hydrocarbon/formation water volume ratio of the subsurface accumulation; and integrating the estimated type of hydrocarbons in the subsurface accumulation and the hydrocarbon/formation water volume ratio of the subsurface accumulation with seismic reflection constraints on a volume of the hydrocarbon accumulation and a volume of water present in the hydrocarbon accumulation, thereby determining the volume of hydrocarbons present in the subsurface accumulation.

19. The method of any one of paragraphs 1 to 6, wherein determining the noble gas signature comprises: utilizing a processor and a tangible, machine-readable storage medium that stores machine-readable instructions for execution by the processor, wherein the machine-readable instructions include code for determining expected concentrations of noble gases present in formation waters, code for modeling one or more exchange and fractionation processes in the expected concentrations of noble gases present in the sample, code for measuring concentrations of noble gases present in the sample, code for comparing the measured concentrations of noble gases with the modeled concentrations of noble gases in the formation waters, code for determining, using said comparison, the type of hydrocarbons present in the subsurface.

20. The method of any one of paragraphs 1 to 6, wherein determining the noble gas signature comprises: utilizing a computer program product having computer executable logic recorded on a tangible, machine readable medium, the computer program product comprising: code for determining expected concentrations of noble gases present in formation waters, code for measuring concentrations of noble gases present in the hydrocarbon sample, code for comparing the measured concentrations of noble gases with the modeled concentrations of noble gases in the formation waters, code for determining, using said comparison, a type of hydrocarbons present in the hydrocarbon sample.

21. The method of any one of paragraphs 1 to 20, wherein determining the clumped isotope signature of the sample comprises: determining an expected concentration of isotopologues of a hydrocarbon species; modeling, using high-level ab initio calculations, an expected temperature dependence of isotopologues present in the sample; measuring a clumped isotopic signature of the isotopologues present in the sample; comparing the clumped isotopic signature with the expected concentration of isotopologues; determining, using said comparison, the current equilibrium storage temperature of the hydrocarbon species in the subsurface region of interest.

22. The method of paragraph 21, wherein determining an expected concentration of isotopologues includes determining a stochastic distribution of isotopologues of the hydrocarbon species for a given bulk isotopic signature for the species.

23. The method of paragraph 22, further comprising: where the given bulk isotopic signature of the hydrocarbon species has been altered from secondary isotope exchange processes or from mixing, applying a correction scheme to arrive at an initial primary isotopic signature representative of what was produced from the source rock.

24. The method of paragraph 21, wherein the location comprises a depth.

25. The method of paragraph 24, wherein determining a location includes applying a thermal gradient to an equilibrium storage temperature of the subsurface accumulation.

26. The method of any one of paragraphs 1 to 20, wherein determining the clumped isotope signature of the sample comprises: obtaining a hydrocarbon sample; analyzing the hydrocarbon sample to determine its geochemical signature, said analyzing including measuring a distribution of isotopologues for a hydrocarbon species present in the hydrocarbon sample; determining a stochastic distribution of the isotopologues for the hydrocarbon species; determining a deviation of the measured distribution of isotopologues from the stochastic distribution of the isotopologues for the hydrocarbon species; determining an origin of the hydrocarbon sample; determining a storage temperature of the hydrocarbon species when the origin of the hydrocarbon sample is a hydrocarbon accumulation; and from the storage temperature.

27. The method of paragraph 1, wherein performing reservoir surveillance on the produced fluids from the one of the one or more subsurface regions comprises identifying processes responsible for the deviation from the fingerprints for the region of interest.

28. The method of paragraph 27, further comprises developing a mitigation strategy to lessen the impact of the identified processes.

29. The method of paragraph 1, wherein performing reservoir surveillance on the produced fluids from the one of the one or more subsurface regions comprises using deviations from the fingerprints for reservoir connectivity applications.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A method of producing hydrocarbons comprising:
   obtaining one or more samples from one or more subsurface regions of interest;
   analyzing the one or more samples to determine a noble gas signature and a hydrocarbon clumped isotope signature for each of the obtained one or more samples, wherein the noble gas signature comprises an indication of the concentrations and isotopic ratios of noble gases in each sample and wherein the hydrocarbon clumped isotope signature comprises an indication of the concentration of one or more hydrocarbon isotopologues in each sample having two or more rare isotopes in close proximity;
   generating a region of interest fingerprint comprising the noble gas signature and the hydrocarbon clumped isotope signature for the obtained one or more samples;
   producing fluids from one of the one or more subsurface regions of interest, wherein the produced fluids comprise hydrocarbons; and
   performing reservoir surveillance on the produced fluids from the one of the one or more subsurface regions of interest,
   wherein performing reservoir surveillance on the produced fluids comprises:
      obtaining a first sample from the produced fluids;
      analyzing the first sample to determine a first sample fingerprint, wherein the first sample fingerprint comprises a noble gas signature of the first sample and a hydrocarbon clumped isotope signature of the first sample, wherein the noble gas signature of the first sample comprises an indication of the concentrations and isotopic ratios of noble gases in the first sample, and wherein the hydrocarbon clumped isotope signature of the first sample comprises an indication of the concentration of one or more hydrocarbon isotopologues in the first sample having two or more rare isotopes in close proximity; and
      comparing the first sample fingerprint to the region of interest fingerprint.

2. The method of claim 1, wherein performing reservoir surveillance on the produced fluids further comprises:

obtaining a second sample from the produced fluids, wherein the second sample is obtained a period of time after obtaining of the first sample;

analyzing the second sample to determine a second sample fingerprint, wherein the second sample fingerprint comprises a noble gas signature of the second sample and a hydrocarbon clumped isotope signature of the second sample, wherein the noble gas signature of the second sample comprises an indication of the concentrations and isotopic ratios of noble gases in the second sample, and wherein the hydrocarbon clumped isotope signature of the second sample comprises an indication of the concentration of one or more hydrocarbon isotopologues in the second sample having two or more rare isotopes in close proximity; and comparing the second sample fingerprint to the region of interest fingerprint.

3. The method of claim 1, wherein comparing the first sample fingerprint to the region of interest fingerprint comprises comparing the first sample fingerprint and a static fingerprint for the one of the one or more subsurface regions of interest to determine inter-region changes.

4. The method of claim 1, wherein comparing the first sample fingerprint to the region of interest fingerprint comprises comparing the first sample fingerprint and a dynamic fingerprint for the one of the one or more subsurface regions of interest to determine intra-regional changes.

5. The method of claim 1, further comprising developing a depletion strategy based on the region of interest fingerprint to produce hydrocarbons of a specific quality and composition.

6. The method of claim 1, wherein determining the hydrocarbon clumped isotope signature of the first sample of produced fluids comprises:
determining an expected concentration of isotopologues of a hydrocarbon species from the first sample;
modeling, using high-level ab initio calculations, an expected temperature dependence of isotopologues present in the first sample;
measuring the hydrocarbon clumped isotope signature of the isotopologues present in the first sample;
comparing the hydrocarbon clumped isotope signature with the expected concentration of isotopologues; and
determining an equilibrium storage temperature of the hydrocarbon species from the first sample.

7. The method of claim 6, wherein determining an expected concentration of isotopologues includes determining a stochastic distribution of isotopologues of the hydrocarbon species for a given bulk isotope signature for the hydrocarbon species.

8. The method of claim 6, further comprising using the hydrocarbon clumped isotope signature of the first sample of produced fluids to determine a depth from which the hydrocarbons in the first sample originated.

9. The method of claim 8, wherein determining the depth comprises applying a thermal gradient to the equilibrium storage temperature.

10. The method of claim 8, wherein determining the depth comprises using a geophysical imaging technique.

11. The method of claim 1, wherein determining the noble gas signature of the one or more obtained samples from the one of the one or more subsurface regions of interest comprises:
measuring or modeling an initial concentration of atmospheric noble gases present in formation water in contact with a seep associated with a subsurface hydrocarbon accumulation in the one of the one or more subsurface regions of interest;
modifying the measured or modeled initial concentration of atmospheric noble gases by accounting for ingrowth of radiogenic noble gases during residence time of the formation water;
measuring concentrations and isotopic ratios of atmospheric noble gases and radiogenic noble gases present in the one or more obtained samples;
comparing the measured concentrations and isotopic ratios of the atmospheric noble gases and the radiogenic noble gases present in the one or more obtained samples to the modified measured or modeled concentrations of atmospheric noble gases in the formation water for a plurality of exchange processes; and
comparing an atmospheric noble gas signature measured in a hydrocarbon phase of the one or more obtained samples with the modified measured or modeled concentration of the atmospheric noble gases in the formation water for the plurality of exchange processes.

12. The method of claim 11, wherein the plurality of exchange processes include at least one of equilibrium solubility laws calibrated to reflect conditions in the subsurface hydrocarbon accumulation, Rayleigh-style fractionation to represent de-gassing of an oil phase, and gas stripping to represent enrichment in a gas phase.

13. The method of claim 12, wherein the conditions in the subsurface hydrocarbon accumulation include at least one of reservoir temperature, pressure, formation water salinity and oil density.

14. The method of claim 11, wherein the atmospheric and radiogenic noble gases include at least one of helium (He), neon (Ne), argon (Ar), krypton (Kr), and xenon (Xe).

15. The method of claim 1, wherein the one or more samples from the one of the one or more subsurface regions of interest comprises one of water, oil, natural gas, sediments, rock, fluids present in sediments, fluids from rock pores, and fluids trapped in fluid inclusions.

16. The method of claim 1, wherein performing reservoir surveillance on the produced fluids from one of the one or more subsurface regions comprises identifying processes responsible for the change in the first sample fingerprint from the region of interest fingerprint.

17. The method of claim 16, further comprising developing a mitigation strategy to lessen an impact of the identified processes.

18. The method of claim 1, wherein determining the hydrocarbon clumped isotope signature of the obtained one or more samples from the one of the one or more subsurface regions of interest comprises:
determining an expected concentration of isotopologues of a hydrocarbon species from the one or more obtained samples;
modeling, using high-level ab initio calculations, an expected temperature dependence of isotopologues present in the one or more obtained samples;
measuring the hydrocarbon clumped isotope signature of the isotopologues present in the one or more obtained samples;
comparing the hydrocarbon clumped isotope signature with the expected concentration of isotopologues; and
determining an equilibrium storage temperature of the hydrocarbon species from the one or more obtained samples.

19. The method of claim 18, further comprising using the hydrocarbon clumped isotope signature of the obtained one or more samples from the one of the one or more subsurface regions of interest to determine a depth from which the hydrocarbons in the one or more obtained samples originated.

20. The method of claim 19, wherein determining the depth comprises applying a thermal gradient to the equilibrium storage temperature.

* * * * *